US010187363B2

(12) United States Patent
Smirnoff et al.

(10) Patent No.: US 10,187,363 B2
(45) Date of Patent: Jan. 22, 2019

(54) HYBRID INTEGRATION OF SOFTWARE DEVELOPMENT KIT WITH SECURE EXECUTION ENVIRONMENT

(71) Applicant: VISA INTERNATIONAL SERVICE ASSOCIATION, San Francisco, CA (US)

(72) Inventors: Sergey Smirnoff, Fremont, CA (US); Soumendra Bhattacharya, Union City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 272 days.

(21) Appl. No.: 14/985,853

(22) Filed: Dec. 31, 2015

(65) Prior Publication Data
US 2016/0191236 A1 Jun. 30, 2016

Related U.S. Application Data

(60) Provisional application No. 62/098,788, filed on Dec. 31, 2014.

(51) Int. Cl.
*H04L 29/06* (2006.01)
*H04L 9/08* (2006.01)
(52) U.S. Cl.
CPC .......... *H04L 63/062* (2013.01); *H04L 9/0822* (2013.01); *H04L 9/0861* (2013.01); *H04L 9/0897* (2013.01)
(58) Field of Classification Search
CPC ...................................... H04L 63/062
(Continued)

(56) References Cited

U.S. PATENT DOCUMENTS 5,336,870 A 8/1994 Hughes et al.
5,365,586 A 11/1994 Indeck et al.
(Continued)

FOREIGN PATENT DOCUMENTS

CN 102103683 A 6/2011
EA 11495 B1 4/2009
(Continued)

OTHER PUBLICATIONS

International Search Report and Written Opinion dated Mar. 27, 2015 for International Patent Application No. PCT/US2014/071622, 11 pages.
(Continued)

*Primary Examiner* — Khalil Naghdali
(74) *Attorney, Agent, or Firm* — Kilpatrick Townsend & Stockton

(57) ABSTRACT

A portable communication device may include a mobile application executing in an application execution environment and a secure application executing in a trusted execution environment. The secure application may receive, from the mobile application, a storage request to store sensitive data. The storage request may include an encrypted data type identifier and an encrypted sensitive data. The secure application may decrypt the encrypted data type identifier and the encrypted sensitive data using a transport key, and re-encrypt the sensitive data using a storage key. The re-encrypted sensitive data can then be stored in a memory of the portable communication device which is outside the trusted execution environment.

20 Claims, 8 Drawing Sheets

(58) Field of Classification Search
USPC .................................................. 713/171
See application file for complete search history.

(56) References Cited

U.S. PATENT DOCUMENTS

| | | | |
|---|---|---|---|
| 5,450,537 A | 9/1995 | Hirai et al. |
| 5,613,012 A | 3/1997 | Hoffman |
| 5,625,669 A | 4/1997 | McGregor et al. |
| 5,640,577 A | 6/1997 | Scharmer |
| 5,729,591 A | 3/1998 | Bailey |
| 5,742,845 A | 4/1998 | Wagner |
| 5,781,438 A | 7/1998 | Lee |
| 5,794,259 A | 8/1998 | Kikinis |
| 5,805,706 A | 9/1998 | Davis |
| 5,883,810 A | 3/1999 | Franklin |
| 5,953,710 A | 9/1999 | Fleming |
| 5,956,699 A | 9/1999 | Wong |
| 5,974,430 A | 10/1999 | Mutschler, III et al. |
| 6,000,832 A | 12/1999 | Franklin |
| 6,014,635 A | 1/2000 | Harris |
| 6,044,349 A | 3/2000 | Tolopka et al. |
| 6,044,360 A | 3/2000 | Picciallo |
| 6,067,621 A | 5/2000 | Yu et al. |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,421,729 B1 | 7/2002 | Paltenghe et al. |
| 6,422,462 B1 | 7/2002 | Cohen |
| 6,425,523 B1 | 7/2002 | Shem Ur |
| 6,490,601 B1 | 12/2002 | Markus et al. |
| 6,499,042 B1 | 12/2002 | Markus |
| 6,571,339 B1 | 5/2003 | Danneels et al. |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,850,996 B2 | 2/2005 | Wagner |
| 6,873,974 B1 | 3/2005 | Schutzer |
| 6,879,965 B2 | 4/2005 | Fung |
| 6,901,387 B2 | 5/2005 | Wells |
| 6,907,476 B2 | 6/2005 | Wagner |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,983,882 B2 | 1/2006 | Cassone |
| 6,990,470 B2 | 1/2006 | Hogan |
| 6,991,157 B2 | 1/2006 | Bishop |
| 7,051,929 B2 | 5/2006 | Li |
| 7,062,706 B2 | 6/2006 | Maxwell et al. |
| 7,069,249 B2 | 6/2006 | Stolfo |
| 7,080,048 B1 | 7/2006 | Sines et al. |
| 7,103,576 B2 | 9/2006 | Mann, III |
| 7,110,792 B2 | 9/2006 | Rosenberg |
| 7,111,324 B2 | 9/2006 | Elteto et al. |
| 7,113,930 B2 | 9/2006 | Eccles |
| 7,136,835 B1 | 11/2006 | Flitcroft |
| 7,146,159 B1 | 12/2006 | Zhu |
| 7,159,180 B2 | 1/2007 | Ward |
| 7,177,835 B1 | 2/2007 | Walker |
| 7,177,848 B2 | 2/2007 | Hogan |
| 7,194,437 B1 | 3/2007 | Britto |
| 7,210,169 B2 | 4/2007 | Smith et al. |
| 7,216,292 B1 | 5/2007 | Snapper et al. |
| 7,218,915 B2 | 5/2007 | Craven |
| 7,228,155 B2 | 6/2007 | Saunders |
| 7,231,045 B1 | 6/2007 | Parrott |
| 7,254,569 B2 | 8/2007 | Goodman et al. |
| 7,257,581 B1 | 8/2007 | Steele et al. |
| 7,264,154 B2 | 9/2007 | Harris |
| 7,275,263 B2 | 9/2007 | Bajikar et al. |
| 7,275,685 B2 | 10/2007 | Gray et al. |
| 7,287,692 B1 | 10/2007 | Patel |
| 7,292,999 B2 | 11/2007 | Hobson |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,350,230 B2 | 3/2008 | Forrest |
| 7,353,382 B2 | 4/2008 | Labrou |
| 7,356,706 B2 | 4/2008 | Scheurich |
| 7,366,703 B2 | 4/2008 | Gray et al. |
| 7,374,082 B2 | 5/2008 | Van De Velde et al. |
| 7,376,583 B1 | 5/2008 | Rolf |
| 7,379,919 B2 | 5/2008 | Hogan |
| RE40,444 E | 7/2008 | Linehan |
| 7,412,420 B2 | 8/2008 | Holdsworth |
| 7,413,113 B1 | 8/2008 | Zhu |
| 7,415,270 B2 | 8/2008 | Wilhelmsson et al. |
| 7,415,443 B2 | 8/2008 | Hobson et al. |
| 7,427,033 B1 | 9/2008 | Roskind |
| 7,430,540 B1 | 9/2008 | Asani |
| 7,431,202 B1 | 10/2008 | Meador et al. |
| 7,437,575 B2 | 10/2008 | Dennis et al. |
| 7,437,757 B2 | 10/2008 | Holdsworth |
| 7,444,676 B1 | 10/2008 | Asghari-Kamrani |
| 7,469,151 B2 | 12/2008 | Khan et al. |
| 7,483,845 B2 | 1/2009 | Vetelainen |
| 7,512,975 B2 | 3/2009 | Aissi |
| 7,533,063 B2 | 5/2009 | Kianian |
| 7,533,828 B2 | 5/2009 | Ong |
| 7,548,889 B2 | 6/2009 | Bhambri |
| 7,552,094 B2 | 6/2009 | Park et al. |
| 7,567,934 B2 | 7/2009 | Flitcroft |
| 7,567,936 B1 | 7/2009 | Peckover |
| 7,568,631 B2 | 8/2009 | Gibbs et al. |
| 7,571,139 B1 | 8/2009 | Giordano |
| 7,571,142 B1 | 8/2009 | Flitcroft |
| 7,580,898 B2 | 8/2009 | Brown et al. |
| 7,584,153 B2 | 9/2009 | Brown |
| 7,587,756 B2 | 9/2009 | Peart et al. |
| 7,593,896 B1 | 9/2009 | Flitcroft |
| 7,599,863 B2 | 10/2009 | Sines et al. |
| 7,606,560 B2 | 10/2009 | Labrou |
| 7,627,531 B2 | 12/2009 | Breck et al. |
| 7,627,895 B2 | 12/2009 | Gifford |
| 7,628,322 B2 | 12/2009 | Holtmanns et al. |
| 7,650,314 B1 | 1/2010 | Saunders |
| 7,660,779 B2 | 2/2010 | Goodman et al. |
| 7,664,699 B1 | 2/2010 | Powell |
| 7,685,037 B2 | 3/2010 | Reiners |
| 7,694,130 B1 | 4/2010 | Martinez |
| 7,702,578 B2 | 4/2010 | Fung |
| 7,707,120 B2 | 4/2010 | Dominguez |
| 7,712,655 B2 | 5/2010 | Wong |
| 7,716,596 B2 | 5/2010 | Cao et al. |
| 7,734,527 B2 | 6/2010 | Uzo |
| 7,753,265 B2 | 7/2010 | Harris |
| 7,761,374 B2 | 7/2010 | Sahota et al. |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,857,225 B2 | 12/2010 | Challa et al. |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,560 B2 | 2/2011 | Hammad |

(56) References Cited

U.S. PATENT DOCUMENTS

| | | |
|---|---|---|
| 7,891,563 B2 | 2/2011 | Oder, II |
| 7,896,238 B2 | 3/2011 | Fein |
| 7,922,082 B2 | 4/2011 | Muscato |
| 7,930,537 B2 | 4/2011 | Paatero |
| 7,931,195 B2 | 4/2011 | Mullen |
| 7,938,318 B2 | 5/2011 | Fein |
| 7,954,705 B2 | 6/2011 | Mullen |
| 7,954,717 B2 | 6/2011 | Narendra et al. |
| 7,959,076 B1 | 6/2011 | Hopkins, III |
| 7,966,257 B2 | 6/2011 | DiGioacchino |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,083,145 B2 | 12/2011 | Narendra et al. |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,165,635 B2 | 4/2012 | Khan et al. |
| 8,171,525 B1 | 5/2012 | Pelly et al. |
| 8,196,131 B1 | 6/2012 | Von Behren et al. |
| 8,196,813 B2 | 6/2012 | Vadhri |
| 8,196,818 B2 | 6/2012 | Van De Velde et al. |
| 8,205,791 B2 | 6/2012 | Randazza |
| 8,224,702 B2 | 7/2012 | Mengerink |
| 8,225,089 B2 | 7/2012 | Wang et al. |
| 8,225,385 B2 | 7/2012 | Chow |
| 8,265,993 B2 | 9/2012 | Chien |
| 8,280,777 B2 | 10/2012 | Mengerink |
| 8,302,167 B2 | 10/2012 | Mennes et al. |
| 8,328,095 B2 | 12/2012 | Oder, II |
| 8,376,225 B1 | 2/2013 | Hopkins, III |
| 8,380,177 B2 | 2/2013 | Laracey |
| 8,387,873 B2 | 3/2013 | Saunders |
| 8,401,474 B2 | 3/2013 | Charrat |
| 8,401,539 B2 | 3/2013 | Beenau |
| 8,401,898 B2 | 3/2013 | Chien |
| 8,403,211 B2 | 3/2013 | Brooks |
| 8,412,099 B2 | 4/2013 | Charrat |
| 8,412,623 B2 | 4/2013 | Moon |
| 8,412,631 B2 | 4/2013 | Crofts et al. |
| 8,412,837 B1 | 4/2013 | Emigh |
| 8,417,642 B2 | 4/2013 | Oren |
| 8,447,699 B2 | 5/2013 | Batada et al. |
| 8,447,983 B1 * | 5/2013 | Beck ............... H04L 9/0894 705/65 |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,478 B2 | 8/2013 | Saunders |
| 8,510,816 B2 | 8/2013 | Quach et al. |
| 8,534,564 B2 | 9/2013 | Hammad |
| 8,538,845 B2 | 9/2013 | Liberty |
| 8,555,079 B2 | 10/2013 | Shablygin |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,594,566 B2 | 11/2013 | Zhu et al. |
| 8,595,098 B2 | 11/2013 | Starai |
| 8,595,812 B2 | 11/2013 | Bomar |
| 8,595,850 B2 | 11/2013 | Spies |
| 8,600,355 B1 * | 12/2013 | Sadhvani ............... H04W 12/06 455/411 |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,628,012 B1 | 1/2014 | Wallner |
| 8,635,157 B2 | 1/2014 | Smith |
| 8,644,959 B2 | 2/2014 | Hermann |
| 8,646,059 B1 | 2/2014 | Von Behren |
| 8,651,374 B2 | 2/2014 | Brabson |
| 8,656,180 B2 | 2/2014 | Shablygin |
| 8,677,467 B2 | 3/2014 | Lincoln et al. |
| 8,706,556 B2 | 4/2014 | Mestre et al. |
| 8,712,325 B2 | 4/2014 | Leica et al. |
| 8,719,952 B1 | 5/2014 | Damm-Goossens |
| 9,210,138 B2 | 12/2015 | Nakhjiri |
| 2001/0029485 A1 | 10/2001 | Brody et al. |
| 2001/0032182 A1 | 10/2001 | Kumar et al. |
| 2001/0034720 A1 | 10/2001 | Armes |
| 2001/0042785 A1 | 11/2001 | Walker et al. |
| 2001/0051924 A1 | 12/2001 | Uberti |
| 2001/0054003 A1 | 12/2001 | Chien |
| 2001/0054148 A1 | 12/2001 | Hoornaert et al. |
| 2002/0007320 A1 | 1/2002 | Hogan |
| 2002/0016749 A1 | 2/2002 | Borecki |
| 2002/0023054 A1 | 2/2002 | Gillespie |
| 2002/0029193 A1 | 3/2002 | Ranjan |
| 2002/0035548 A1 | 3/2002 | Hogan |
| 2002/0073045 A1 | 6/2002 | Rubin |
| 2002/0091877 A1 | 7/2002 | Karidis |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0115142 A1 | 6/2003 | Brickell et al. |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0058705 A1 | 3/2004 | Morgan et al. |
| 2004/0059682 A1 | 3/2004 | Hasumi |
| 2004/0093281 A1 | 5/2004 | Silverstein |
| 2004/0104268 A1 | 6/2004 | Bailey |
| 2004/0127256 A1 | 7/2004 | Goldthwaite et al. |
| 2004/0139008 A1 | 7/2004 | Mascavage |
| 2004/0143532 A1 | 7/2004 | Lee |
| 2004/0158532 A1 | 8/2004 | Breck |
| 2004/0188519 A1 | 9/2004 | Cassone |
| 2004/0210449 A1 | 10/2004 | Breck |
| 2004/0210498 A1 | 10/2004 | Freund |
| 2004/0210821 A1 | 10/2004 | Kasser |
| 2004/0226999 A1 | 11/2004 | Ruat et al. |
| 2004/0232225 A1 | 11/2004 | Bishop |
| 2004/0248554 A1 | 12/2004 | Khan et al. |
| 2004/0254890 A1 | 12/2004 | Sancho et al. |
| 2004/0260646 A1 | 12/2004 | Berardi |
| 2005/0037735 A1 | 2/2005 | Coutts |
| 2005/0043997 A1 | 2/2005 | Sahota et al. |
| 2005/0080730 A1 | 4/2005 | Sorrentino |
| 2005/0108178 A1 | 5/2005 | York |
| 2005/0108569 A1 | 5/2005 | Bantz et al. |
| 2005/0109838 A1 | 5/2005 | Linlor |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2005/0278461 A1 | 12/2005 | Ohta |
| 2006/0016879 A1 | 1/2006 | Kean |
| 2006/0131390 A1 | 6/2006 | Kim |
| 2006/0142058 A1 | 6/2006 | Elias et al. |

(56) References Cited

U.S. PATENT DOCUMENTS

| | | |
|---|---|---|
| 2006/0168653 A1 | 7/2006 | Contrera |
| 2006/0235795 A1 | 10/2006 | Johnson |
| 2006/0237528 A1 | 10/2006 | Bishop |
| 2006/0253389 A1 | 11/2006 | Hagale |
| 2006/0278704 A1 | 12/2006 | Saunders |
| 2006/0294023 A1 | 12/2006 | Lu |
| 2006/0294370 A1 | 12/2006 | Greenspan |
| 2007/0005685 A1 | 1/2007 | Chau et al. |
| 2007/0107044 A1 | 5/2007 | Yuen |
| 2007/0114274 A1 | 5/2007 | Gibbs |
| 2007/0129955 A1 | 6/2007 | Dalmia |
| 2007/0136193 A1 | 6/2007 | Starr |
| 2007/0136211 A1 | 6/2007 | Brown |
| 2007/0143828 A1 | 6/2007 | Jeal et al. |
| 2007/0170247 A1 | 7/2007 | Friedman |
| 2007/0178883 A1 | 8/2007 | Nandagopal |
| 2007/0179885 A1 | 8/2007 | Bird |
| 2007/0208671 A1 | 9/2007 | Brown |
| 2007/0228148 A1 | 10/2007 | Rable |
| 2007/0245414 A1 | 10/2007 | Chan |
| 2007/0284443 A1 | 12/2007 | Anson et al. |
| 2007/0288377 A1 | 12/2007 | Shaked |
| 2007/0291995 A1 | 12/2007 | Rivera |
| 2008/0001744 A1 | 1/2008 | Batra et al. |
| 2008/0011823 A1 | 1/2008 | Patel et al. |
| 2008/0014867 A1 | 1/2008 | Finn |
| 2008/0015988 A1 | 1/2008 | Brown |
| 2008/0029607 A1 | 2/2008 | Mullen |
| 2008/0034221 A1 | 2/2008 | Hammad et al. |
| 2008/0035738 A1 | 2/2008 | Mullen |
| 2008/0040276 A1 | 2/2008 | Hammad et al. |
| 2008/0040285 A1 | 2/2008 | Wankmueller |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0071681 A1 | 3/2008 | Khalid |
| 2008/0110983 A1 | 5/2008 | Ashfield |
| 2008/0142582 A1 | 6/2008 | Corioni |
| 2008/0154770 A1 | 6/2008 | Rutherford et al. |
| 2008/0177796 A1 | 7/2008 | Eldering |
| 2008/0201264 A1 | 8/2008 | Brown |
| 2008/0201265 A1 | 8/2008 | Hewton |
| 2008/0208759 A1 | 8/2008 | Royyuru |
| 2008/0228646 A1 | 9/2008 | Myers |
| 2008/0228653 A1 | 9/2008 | Holdsworth |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0289022 A1 | 11/2008 | Chiu |
| 2008/0302869 A1 | 12/2008 | Mullen |
| 2008/0302876 A1 | 12/2008 | Mullen |
| 2008/0319905 A1 | 12/2008 | Carlson |
| 2009/0006262 A1 | 1/2009 | Brown |
| 2009/0006646 A1 | 1/2009 | Duarte |
| 2009/0010488 A1 | 1/2009 | Matsuoka |
| 2009/0037333 A1 | 2/2009 | Flitcroft |
| 2009/0043702 A1 | 2/2009 | Bennett |
| 2009/0048971 A1 | 2/2009 | Hathaway |
| 2009/0104888 A1 | 4/2009 | Cox |
| 2009/0106112 A1 | 4/2009 | Dalmia |
| 2009/0106138 A1 | 4/2009 | Smith et al. |
| 2009/0106160 A1 | 4/2009 | Skowronek |
| 2009/0132413 A1 | 5/2009 | Engelbrecht |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Mcato |
| 2009/0200371 A1 | 8/2009 | Kean |
| 2009/0219430 A1 | 9/2009 | Okamoto et al. |
| 2009/0248583 A1 | 10/2009 | Chhabra |
| 2009/0255987 A1 | 10/2009 | Olivares Baena |
| 2009/0265260 A1 | 10/2009 | Aabye et al. |
| 2009/0276347 A1 | 11/2009 | Kargman |
| 2009/0289110 A1 | 11/2009 | Regen et al. |
| 2009/0294527 A1 | 12/2009 | Brabson |
| 2009/0307139 A1 | 12/2009 | Mardikar et al. |
| 2009/0307493 A1 | 12/2009 | Smith |
| 2009/0308921 A1 | 12/2009 | Mullen |
| 2009/0313168 A1 | 12/2009 | Manessis |
| 2009/0319430 A1 | 12/2009 | Faith et al. |
| 2009/0319431 A1 | 12/2009 | Aiello et al. |
| 2009/0319784 A1 | 12/2009 | Faith et al. |
| 2009/0327131 A1 | 12/2009 | Beenau |
| 2010/0008535 A1 | 1/2010 | Abulafia |
| 2010/0042841 A1 | 2/2010 | King et al. |
| 2010/0082444 A1 | 4/2010 | Lin et al. |
| 2010/0082485 A1 | 4/2010 | Lin et al. |
| 2010/0088237 A1 | 4/2010 | Wankmueller |
| 2010/0094755 A1 | 4/2010 | Kloster |
| 2010/0106644 A1 | 4/2010 | Annan |
| 2010/0114776 A1 | 5/2010 | Weller et al. |
| 2010/0120408 A1 | 5/2010 | Beenau |
| 2010/0125516 A1 | 5/2010 | Wankmueller et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0176935 A1 | 7/2010 | Phillips |
| 2010/0185545 A1 | 7/2010 | Royyuru et al. |
| 2010/0211505 A1 | 8/2010 | Saunders |
| 2010/0223184 A1 | 9/2010 | Perlman |
| 2010/0223186 A1 | 9/2010 | Hogan |
| 2010/0228668 A1 | 9/2010 | Hogan |
| 2010/0235284 A1 | 9/2010 | Moore |
| 2010/0257102 A1 | 10/2010 | Perlman |
| 2010/0258620 A1 | 10/2010 | Torreyson |
| 2010/0274692 A1 | 10/2010 | Hammad |
| 2010/0274721 A1 | 10/2010 | Hammad |
| 2010/0291904 A1 | 11/2010 | Musfeldt et al. |
| 2010/0293189 A1 | 11/2010 | Hammad |
| 2010/0293381 A1 | 11/2010 | Hammad |
| 2010/0293382 A1 | 11/2010 | Hammad |
| 2010/0306076 A1 | 12/2010 | Taveau et al. |
| 2010/0318801 A1 | 12/2010 | Roberge et al. |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0112918 A1 | 5/2011 | Mestre et al. |
| 2011/0112920 A1 | 5/2011 | Mestre et al. |
| 2011/0125597 A1 | 5/2011 | Oder, II |
| 2011/0153437 A1 | 6/2011 | Archer et al. |
| 2011/0154466 A1 | 6/2011 | Harper |
| 2011/0161233 A1 | 6/2011 | Tieken |
| 2011/0184867 A1 | 7/2011 | Varadarajan |
| 2011/0191244 A1 | 8/2011 | Dai |
| 2011/0208529 A1 | 8/2011 | Jeal et al. |
| 2011/0238511 A1 | 9/2011 | Park |
| 2011/0238573 A1 | 9/2011 | Varadarajan |
| 2011/0238579 A1 | 9/2011 | Coppinger |
| 2011/0246317 A1 | 10/2011 | Coppinger |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276418 A1 | 11/2011 | Velani |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hrka |
| 2012/0035998 A1 | 2/2012 | Chien |
| 2012/0041881 A1 | 2/2012 | Basu |
| 2012/0047237 A1 | 2/2012 | Arvidsson et al. |

(56) References Cited

U.S. PATENT DOCUMENTS

| | | |
|---|---|---|
| 2012/0066078 A1 | 3/2012 | Kingston |
| 2012/0072350 A1 | 3/2012 | Goldthwaite |
| 2012/0078735 A1 | 3/2012 | Bauer et al. |
| 2012/0078798 A1 | 3/2012 | Downing |
| 2012/0078799 A1 | 3/2012 | Jackson |
| 2012/0084206 A1 | 4/2012 | Mehew et al. |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0124394 A1 | 5/2012 | Brudnicki et al. |
| 2012/0129514 A1 | 5/2012 | Beenau |
| 2012/0143752 A1 | 6/2012 | Wong et al. |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama et al. |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0265631 A1 | 10/2012 | Cronic |
| 2012/0271770 A1 | 10/2012 | Harris |
| 2012/0290376 A1 | 11/2012 | Dryer et al. |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2012/0317628 A1 | 12/2012 | Yeager |
| 2012/0324566 A1 | 12/2012 | Baum et al. |
| 2013/0017784 A1 | 1/2013 | Fisher |
| 2013/0019098 A1 | 1/2013 | Gupta |
| 2013/0028502 A1 | 1/2013 | Nepomniachtchi et al. |
| 2013/0054336 A1 | 2/2013 | Graylin |
| 2013/0054337 A1 | 2/2013 | Brendell |
| 2013/0054466 A1 | 2/2013 | Mcato |
| 2013/0054474 A1 | 2/2013 | Yeager |
| 2013/0081122 A1 | 3/2013 | Svigals |
| 2013/0086375 A1 | 4/2013 | Lyne et al. |
| 2013/0091028 A1 | 4/2013 | Oder |
| 2013/0110658 A1 | 5/2013 | Lyman et al. |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0140360 A1 | 6/2013 | Graylin |
| 2013/0144888 A1 | 6/2013 | Faith |
| 2013/0145148 A1 | 6/2013 | Shablygin |
| 2013/0145172 A1 | 6/2013 | Shablygin |
| 2013/0145455 A1 | 6/2013 | Vijayshankar et al. |
| 2013/0159178 A1 | 6/2013 | Colon |
| 2013/0159186 A1 | 6/2013 | Brudnicki et al. |
| 2013/0166402 A1 | 6/2013 | Parento |
| 2013/0166448 A1 | 6/2013 | Narayanan |
| 2013/0166456 A1 | 6/2013 | Zhang |
| 2013/0173736 A1 | 7/2013 | Krzeminski |
| 2013/0179348 A1 | 7/2013 | Crofts et al. |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212666 A1 | 8/2013 | Mattsson |
| 2013/0218698 A1 | 8/2013 | Moon |
| 2013/0226812 A1 | 8/2013 | Landrok et al. |
| 2013/0226813 A1 | 8/2013 | Voltz |
| 2013/0232083 A1 | 9/2013 | Smith et al. |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0268776 A1 | 10/2013 | Motoyama |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297504 A1 | 11/2013 | Nwokolo |
| 2013/0297508 A1 | 11/2013 | Belamant |
| 2013/0304649 A1 | 11/2013 | Cronic |
| 2013/0305035 A1 | 11/2013 | Lyne et al. |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339166 A1 | 12/2013 | Baer et al. |
| 2013/0339253 A1 | 12/2013 | Sincai |
| 2013/0340048 A1* | 12/2013 | Sebastian ............... H04L 63/08 726/4 |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0020073 A1 | 1/2014 | Ronda et al. |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki et al. |
| 2014/0040144 A1 | 2/2014 | Plomske |
| 2014/0040145 A1 | 2/2014 | Ozvat |
| 2014/0040148 A1 | 2/2014 | Ozvat |
| 2014/0040149 A1 | 2/2014 | Fiske |
| 2014/0040628 A1 | 2/2014 | Fort |
| 2014/0041018 A1 | 2/2014 | Bomar |
| 2014/0046853 A1 | 2/2014 | Spies |
| 2014/0052532 A1 | 2/2014 | Tsai |
| 2014/0052620 A1 | 2/2014 | Rogers |
| 2014/0052637 A1 | 2/2014 | Jooste |
| 2014/0074635 A1 | 3/2014 | Reese et al. |
| 2014/0074637 A1 | 3/2014 | Hammad |
| 2014/0074724 A1 | 3/2014 | Gordon et al. |
| 2014/0100973 A1 | 4/2014 | Brown et al. |
| 2014/0108263 A1 | 4/2014 | Ortiz et al. |
| 2014/0108265 A1 | 4/2014 | Hayhow et al. |
| 2014/0123237 A1 | 5/2014 | Gaudet et al. |
| 2014/0129438 A1 | 5/2014 | Desai et al. |

(56) References Cited

U.S. PATENT DOCUMENTS

| | | |
|---|---|---|
| 2014/0236842 A1 | 8/2014 | Salminen et al. |
| 2014/0246492 A1 | 9/2014 | Hill et al. |
| 2015/0180836 A1 | 6/2015 | Wong |

FOREIGN PATENT DOCUMENTS

| | | |
|---|---|---|
| EP | 1168265 A1 | 1/2002 |
| EP | 2098985 A2 | 9/2009 |
| EP | 2156397 A1 | 2/2010 |
| EP | 2515472 A1 | 10/2012 |
| GB | 2459850 A | 11/2009 |
| JP | 2008-210370 A | 9/2008 |
| KR | 10-2000-0054496 A | 9/2000 |
| KR | 10-2005-0019674 A | 3/2005 |
| KR | 10-2006-0096821 A | 9/2006 |
| KR | 10-2007-0100076 A | 10/2007 |
| KR | 10-2008-0026802 A | 3/2008 |
| KR | 10-2008-0039330 A | 5/2008 |
| KR | 10-2008-0051198 A | 6/2008 |
| KR | 10-2008-0021388 A | 3/2009 |
| KR | 10-2009-0044619 A | 5/2009 |
| KR | 10-2010-0110642 A | 10/2010 |
| RU | 2252451 C2 | 5/2005 |
| RU | 2331110 C2 | 8/2008 |
| WO | 2001/16900 A2 | 3/2001 |
| WO | 2001/035304 A1 | 5/2001 |
| WO | 2002/01520 A1 | 1/2002 |
| WO | 2002/059727 A2 | 8/2002 |
| WO | 2003/047208 A1 | 6/2003 |
| WO | 2004/042536 A2 | 5/2004 |
| WO | 2006/099294 A1 | 9/2006 |
| WO | 2006/113834 A2 | 10/2006 |
| WO | 2008/014554 A1 | 2/2008 |
| WO | 2009/025605 A3 | 2/2009 |
| WO | 2009/032523 A1 | 3/2009 |
| WO | 2009/052634 A1 | 4/2009 |
| WO | 2010/078522 A1 | 7/2010 |
| WO | 2012/068078 A2 | 5/2012 |
| WO | 2012/098556 A1 | 7/2012 |
| WO | 2012/142370 A2 | 10/2012 |
| WO | 2012/167941 A1 | 12/2012 |
| WO | 2013/048538 A1 | 4/2013 |
| WO | 2013/049213 A1 | 4/2013 |
| WO | 2013/056104 A1 | 4/2013 |
| WO | 2013/096486 A1 | 6/2013 |
| WO | 2013/101035 A1 | 7/2013 |
| WO | 2013/116817 A1 | 8/2013 |
| WO | 2013/119914 A1 | 8/2013 |
| WO | 2013/130982 A1 | 9/2013 |
| WO | 2013/155627 A1 | 10/2013 |
| WO | 2013/179271 A2 | 12/2013 |
| WO | 2014/012037 A1 | 1/2014 |
| WO | 2015/113841 A1 | 8/2015 |
| WO | 2005/109360 A1 | 11/2015 |

OTHER PUBLICATIONS

International Search Report and Written Opinion dated Jul. 27, 2015 for International Patent Application No. PCT/US2015/031968, 9 pages.

"2.4.2 How Visa Card Verification Values are Used," 2.4.2 "z/OS V1R3.0 ICSF Application Programmer's Guide" IBM Library Server, 1 page, © Copyright IBM Corp. 1997, 2002, downloaded Mar. 27, 2012 from URL: http://publibz.boulder.ibm.com/cgi-bin/bookmgr_OS390/BOOKS/CSFB4Z20/2.4.2?SHEL.

Reisinger, D., "PayPal offers SMS security key for mobile users," Nov. 24, 2008, pp. 1-3, © Copyright CBS Interactive, downloaded Mar. 27, 2012 from URL: http://news.cnet.com/8301-17939_1209-10106410-2.html.

U.S. Appl. No. 14/834,028, filed Aug. 24, 2015 to Lopez.

* cited by examiner

HYBRID INTEGRATION OF SOFTWARE DEVELOPMENT KIT WITH SECURE EXECUTION ENVIRONMENT

CROSS-REFERENCES TO RELATED APPLICATIONS

This application is a non-provisional of and claims the benefit to U.S. Provisional Patent App. No. 62/098,788, filed Dec. 31, 2014, which is herein incorporated by reference in its entirety for all purposes.

BACKGROUND

Card emulation technology has allowed mobile devices (e.g., mobile phones) to interact with access devices to perform transactions without requiring the use of a secure element. However, without using a secure element to safeguard the security sensitive operations involved in a transaction, sensitive data such as account credentials can be exposed to malware or rouge applications.

Embodiments of the disclosure address this and other problems, individually and collectively.

BRIEF SUMMARY

Embodiments of the present disclosure provide techniques for enhancing the security of a portable communication device without requiring the use of a secure element. To protect security sensitive functions and sensitive data, a secure application implementing security sensitive functions is executed in a trusted execution environment. An application program interface is provided to allow a mobile application executing in the application execution environment of the portable communication device to invoke the security sensitive functions of the secure application. The secure application can manage sensitive data for the mobile application, and perform encryption and decryption of the sensitive data such that the sensitive data is not store in the clear outside the trusted execution environment.

Some embodiments provide a portable communication device. The portable communication device comprises one or more processor circuits. The portable communication device also comprises one or more memory units coupled to the one or more processor circuits. The one or more memory units store computer readable code implementing a secure application in a trusted execution environment. The computer readable code, when executed by the one or more processor circuits, performs receiving, by the secure application from a mobile application executing in an application execution environment, a first storage request to store first sensitive data. The first storage request includes a first encrypted data type identifier and first encrypted sensitive data. The computer readable code, when executed by the one or more processor circuits, also performs decrypting, by the secure application, the first encrypted data type identifier and the first encrypted sensitive data using a communication device transport key. The computer readable code, when executed by the one or more processor circuits also performs determining, by the secure application, that the first data type identifier indicates the first sensitive data to store is a cryptogram generation key. The computer readable code, when executed by the one or more processor circuits, also performs re-encrypting, by the secure application, of the first sensitive data using a key-storage key to generate a re-encrypted cryptogram generation key. The computer readable code, when executed by the one or more processor circuits also performs storing the re-encrypted cryptogram generation key outside the trusted execution environment.

Some embodiments provide a method for managing sensitive data in a portable communication device having a mobile application executing in an application execution environment and a secure application executing in a trusted execution environment. The method comprises receiving, by the secure application from the mobile application, a storage request to store sensitive data. The storage request includes an encrypted data type identifier and encrypted sensitive data. The method also comprises decrypting, by the secure application, the encrypted data type identifier and the encrypted sensitive data using a transport key. The method also comprises determining, by the secure application, that the data type identifier indicates the sensitive data is a cryptogram generation key. The method also comprises re-encrypting, by the secure application, the sensitive data using a key-storage key to generate a re-encrypted cryptogram generation key. The method also comprises storing the re-encrypted cryptogram generation key in a memory of the portable communication device which is outside the trusted execution environment.

DETAILED DESCRIPTION

Figure 1:
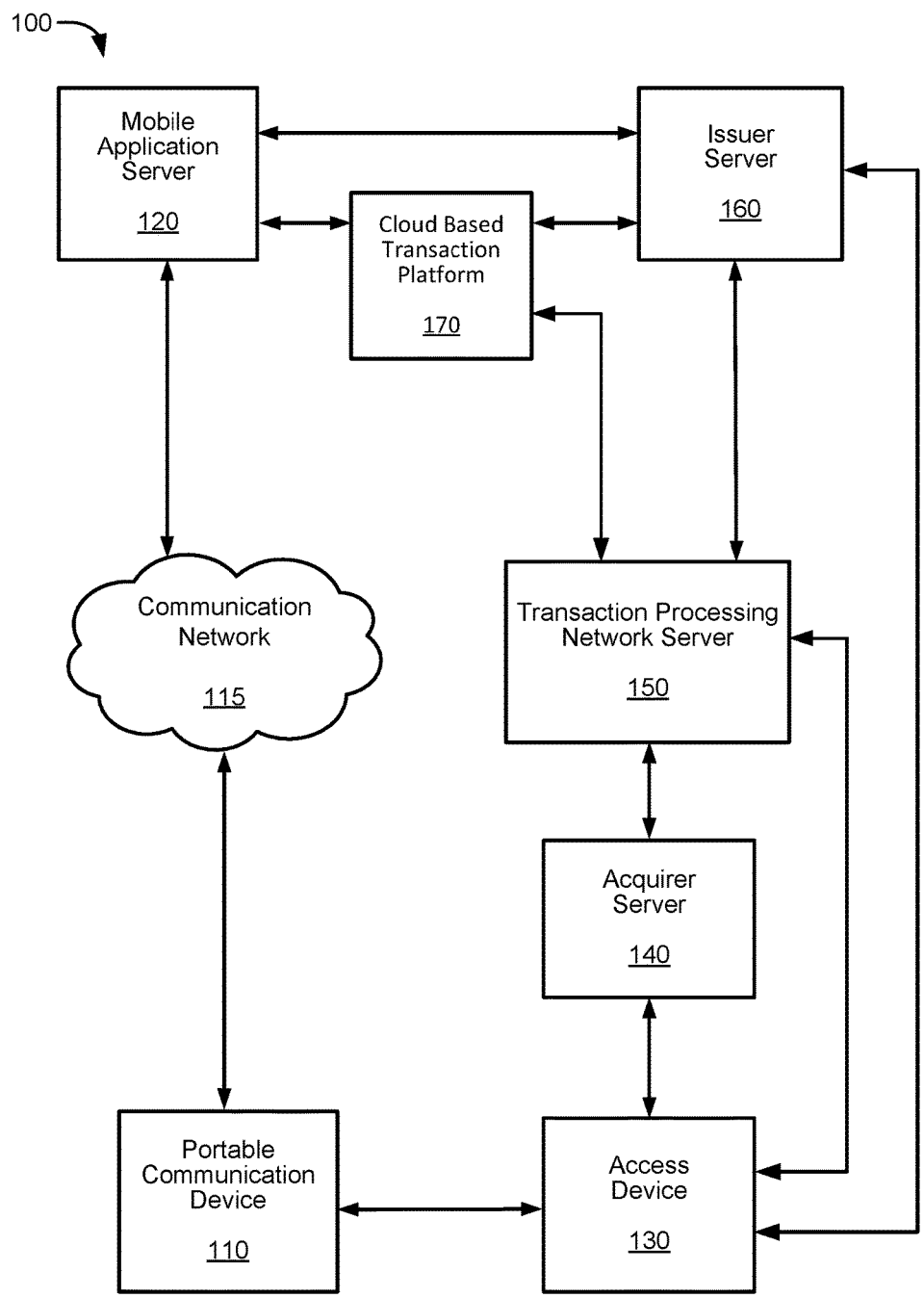
FIG. 1 shows a system for conducting transactions, according to some embodiments.

Embodiments of the present invention provide techniques for enhancing the security of a portable communication device without requiring the use of a secure element. To protect security sensitive functions and sensitive data, a secure application implementing security sensitive functions is executed in a trusted execution environment. An application program interface is provided to allow a mobile application executing in the application execution environment of the portable communication device to invoke the security sensitive functions of the secure application. The secure application can manage sensitive data for the mobile application, and perform encryption and decryption of the sensitive data such that the sensitive data are not store in the clear outside the trusted execution environment.

Prior to discussing the embodiments, terms related to the embodiments are described.

A "communication device" may be a device that includes one or more electronic components (e.g., an integrated chip) that can communicate with another device. For example, a communication device can be a computing device that includes at least one processor coupled to a memory that stores instructions or code for execution by the processor. A "portable communication device" may be a communication device that may be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., watch, health monitoring device such as a fitness tracker, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer server may be associated with the issuer and may perform some or all of the functions of the issuer on behalf of the issuer.

A "merchant" may typically be an entity that engages in transactions and can sell goods or services, or provide access to goods or services. An access device, described below, may be associated with the merchant and may perform some or all of the functions of the merchant on behalf of the merchant.

An "acquirer" may typically be a business entity (e.g., a commercial bank) that has a business relationship with a particular merchant or other entity. An acquirer server may be associated with the acquirer and may perform some or all of the functions of the acquirer on behalf of the acquirer. Some entities can perform both issuer and acquirer functions. Some embodiments may encompass such single entity issuer-acquirers.

An "access device" may be any suitable device for communicating with a merchant computer or transaction processing network server, and for interacting with a transaction device (e.g., a payment device), a user computer apparatus, and/or a user mobile device. An access device may generally be located in any suitable location, such as at the location of a merchant. An access device may be in any suitable form. Some examples of access devices include point-of-sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites hosted on a computing device, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a transaction processing network server and/or an issuer of an account. An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network server. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network server) to the merchant computer that indicates approval of the transaction. The code may serve as proof of authorization. As noted above, in some embodiments, a transaction processing network server may generate or forward the authorization response message to the merchant.

The term "authentication" and its derivatives may refer to a process by which the credential of an endpoint (including but not limited to applications, people, devices, processes, and systems) can be verified to ensure that the endpoint is who they are declared to be.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "token" may include a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with a account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptogram generation key" may refer to a key that is used to generate a cryptogram. For example, a cryptogram can be generated by encrypting data with a cryptogram generation key. In some embodiments, a cryptogram generation key can be a limited-use key.

A "limited-use threshold" may refer to a condition that limits the usage of a piece of information. A limited-use threshold may be exceeded or exhausted when the underlying condition is met. For example, a limited-use threshold may include a time-to-live that indicates an amount of time that a piece of information is valid for, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "limited-use key" may refer to a key that is used in a cryptographic algorithm which is operably limited by at least one limited-use threshold.

A "transaction processing network" may include a network that can process and route transaction request messages. An exemplary transaction processing network may include data processing subsystems, servers, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

An "application execution environment" may be an environment on a computing device for executing an application. The application execution environment may be supported in software, hardware, firmware or a combination thereof. Applications executed in the application execution environment are not isolated from other applications executed in the application execution environment, and thus can be vulnerable to malware and other malicious code running in the application execution environment.

A "trusted execution environment" (TEE) may be a secure environment on the computing device for securely executing an application. A trusted execution environment may be supported in software, hardware, firmware or a combination thereof. The trusted execution environment may be implemented so that its execution and data space are isolated from other environments executing code on the computing device (e.g., the application execution environment). For example, the trusted execution environment may have dedicated or protected processing and system resources, such as secure storage and protected memory buffers. In some implementations, a trusted execution environment may have paging structures, exception handlers, protected memory regions and hardware resources dedicated or associated with the trusted execution environment. A trusted execution environment is not limited to but may be implemented using virtualization technology.

An "attestation value" is a value or string representing the state of a software or hardware component. An attestation value can be used to indicate the presence, identity, and integrity of a component installed or available on a device.

Details of some embodiments of the present invention will now be described.

FIG. 1 shows a system 100 for conducting transactions, according to some embodiments. System 100 may include a cloud-based transaction platform (CBP) 170 and a mobile application server 120 to manage cloud-based transactions conducted using portable communication device 110. CBP 170 may be referred to as a remote computer, and may be implemented using one or more computing devices or computers, such as one or more server computers, and can be associated with or be operated by a cloud-based service provider such as an issuer, transaction processor, and/or other suitable entities. CBP 170 may manage cloud-based accounts, provide verification functions for cloud-based transactions, manage lifecycle messages from an issuer server 160 or from the mobile application server 120, as well as initiate lifecycle management events. CBP 170 may also assist the issuer server 160 with post transaction functionalities to mitigate the risk against counterfeit account parameters, and limit the exposure on account parameters stored on the device. For example, CBP 170 can be used to facilitate requests from the issuer server 160 for periodic post transaction verification of transactions and/or validation of account parameters replenishment requests using post transaction information.

CBP 170 may also implement a set of key management functions that manages issuer master derivation keys (MDKs) from which cryptogram generation keys such as limited-use keys (LUKs) for cloud-based transactions are derived. CBP 170 may implement a set of provisioning functions that manages the preparation and delivery of cloud-based account parameters (e.g., token or other account identifier, initial cryptogram generation key or LUK and associated key index, etc.) to the mobile application server 120 for the initial setup of a mobile application on the portable communication device 110. CBP 170 may also manage the cloud-based accounts for processing by the issuer server 160, and may perform active account management functions such as functions to generate account parameters based on requests or the risk profile of the cloud-based account per CBP 170 risk management parameters. CBP 170 may also maintain the account status for each cloud-based account, and manage the replenishment or refreshing of the account parameters.

In some embodiments, CBP 170 may also implement or be provided with access to a token service and/or a token vault. The token service can be used to generate, process, and maintain tokens, which are substitute identifiers for account identifiers. During a transaction, instead of using a real account identifier (e.g., a primary account number (PAN)) to identify the account of the user, a token can be used instead to identify the account. By using a token as a substitute for an account identifier, the risk of comprising real account information can be mitigated. A token may have its own set of use restrictions, and the token service may manage the deployment and usage of the tokens according to their use restrictions. The token service may be in communication with the token vault where the generated tokens are stored. Specifically, the token vault may maintain a mapping between a token and the real account identifier (e.g., PAN) represented by the token. During transaction processing, the token vault may retrieve the real account identifier or PAN associated with the token.

The mobile application server 120 is used to facilitate communications between a mobile application executing on the portable communication device 110 and other entities in the system 100, such as CBP 170 and/or the issuer server 160, etc. The mobile application server 120 may communicate with the portable communication device 110 via a communications network 115 such as the Internet. In some embodiments, portable communication device 110 may not always have constant network connectivity, and thus one of the primary roles of the mobile application server 120 is to intermediate requests between the mobile application and the other entities in the system 100 to ensure that requests and responses involving the mobile application are fulfilled as soon as network connectivity to portable communication device 110 is established. The mobile application server 120 may be referred to as a remote computer, and may be implemented using one or more computing devices or computers such as one or more server computers, and can be associated with or be operated by the provider of mobile application. The provider of mobile application can be, for example, an issuer, a bank, a third-party mobile wallet provider, a merchant, or other suitable entities. In some embodiments, the mobile application server 120 can be associated with or be operated by the same entity as CBP 170, or they can be operated by separate entities. Although the mobile application server 120 is illustrated as a separate logical entity in FIG. 1, some or all of the functionalities of the mobile application server 120 may be integrated as part of CBP 170. Examples of the mobile application server 120 may include mobile banking platforms and mobile wallet platforms.

In some embodiments, the mobile application server 120 may implement authentication functionalities to authenticate the portable communication device 110 when the portable communication device 110 communicates with the other entities in the system 100 via the mobile application server 120. The authentication functionalities may ensure that a portable communication device communicating with the system is an authorized portable communication device and/or a portable communication device that has not been hacked, infected with malware or virus, or otherwise been compromised. For example, the mobile application server 120 may perform, request, or facilitate a device fingerprint of the portable communication device 110 to capture the state of the portable communication device 110 when the portable communication device 110 communicates with the mobile application server 120. The fingerprint of the portable communication device 110 may capture information about the operating system and version, applications installed on the portable communication device 110, memory usage, whether portable communication device 110 has been jail-broken, device identifiers such as a portable communication device identifier, and/or other suitable device characteristics.

The mobile application server 120 may verify the device fingerprint of portable communication device 110 for each communication session established with the portable communication device 110 or periodically (e.g., once every five communication sessions, once a month, etc.). If the device fingerprint of the portable communication device 110 indicates that the portable communication device 110 is not an authorized device for an account (e.g., the portable communication device requesting replenishment of account parameters is a different device than the original device that was used to enroll the account), or if the device fingerprint indicates that the portable communication device may potentially be hacked, the mobile application server 120 may prevent the portable communication device 110 from communicating with the system 110 and may send an alert to the issuer server 160 that the portable communication device 110 may have been compromised. In some embodiments, the device fingerprint can be in the form of a set of attestation values representing the state of the portable communication device 110.

The mobile application server 120 may perform enrollment functions to enroll a mobile cardholder into a cloud-based transactions program, and provide a set of provisioning functions that facilitates the preparation and delivery of the account parameters to the mobile application executing on the portable communication device 110. The mobile application server 120 may perform account parameters replenishment functions to facilitate the account parameter replenishment process for the cloud-based account provisioned on portable communication device 110, and lifecycle management functions that manage lifecycle messages from the issuer server 160, CBP 170, and/or the mobile application. The mobile application server 120 may also perform post-transaction functions to mitigate the risk against counterfeit account parameters, and to limit the exposure on account parameters stored on portable communication device 110, such as facilitating periodic post transaction verification of transactions or the use of post transaction information to validate account parameters replenishment requests.

The portable communication device 110 can be used to conduct cloud-based transactions facilitated by CBP 170 and/or the mobile application server 120. The components in the portable communication device 110 may include device hardware, a mobile operating system (OS), and an applications environment in which the mobile application may operate, as further described below. For example, the device hardware may include a contactless interface that can interact with a contactless reader of an access device 130. Examples of the contactless interface may include one or more radio frequency (RF) transceivers that can send and receive communications using near-field communications (NFC), or other radio frequency or wireless communication protocols such as Bluetooth, Bluetooth low-energy (BLE), WiFi, iBeacon, etc. In some embodiments, the contactless interface may include an optical interface (e.g., a display screen) to present transaction information in the form of an image such as a quick response (QR) code, or bar code, etc. to the contactless reader of the access device when the contactless reader includes an optical code scanner or reader.

The application execution environment of portable communication device 110 may host a mobile application, which may be provided by a mobile application provider. For example, if the provider of mobile application is an issuer, then the mobile application may be a mobile banking application or a separate mobile payment application. If the provider is a mobile wallet provider, such as a mobile network operator or third-party wallet provider that supports multiple issuers, then the mobile application may be a mobile wallet application. For merchants, the mobile application may be a merchant's own mobile application from which consumers can conduct e-commerce or point of sale transactions with that merchant, or may be a mobile wallet application that supports multiple merchants.

According to some embodiments, the mobile application may include on-device cloud-based transaction software (e.g., can be in the form of a software developer kit (SDK)) integrated into the mobile application to support cloud-based transaction functionalities. The on-device cloud-based transaction software may perform functions to facilitate cloud-based transactions such as to take the account parameters (e.g., LUK), generate transaction cryptograms, and deliver them to the mobile operating system for transmission over the contactless interface. The on-device cloud-based transaction software may also manage the initial service profile parameters (e.g., limited-use thresholds) that are provided after an account has been provisioned to ensure that requests for account parameter replenishment and other account parameter management activities are initiated.

The mobile application may perform functions to manage the risk profile of the cloud-based account, maintain the account status, and replenish account parameters for each cloud-based account based on the on-device threshold management parameters. The mobile application may also manage lifecycle messages from the issuer server 160 or lifecycle messages from the mobile application server 120. The mobile application may also perform a set of functions to enroll the mobile cardholder into the cloud-based transactions program, and perform a set of functions that manages the receiving and configuration of the cloud-based account parameters received from the mobile application server 120. The mobile application may also provide consumer device cardholder verification method (CDCVM) functions for cloud-based transactions, and perform a set of functions that processes and responds to messages in support of post-transaction processing to limit the exposure of account parameters stored on the portable communication device. For example, post-transaction processing may include periodic post-transaction verification of transactions or using post-transaction information to validate account parameters replenishment requests.

In secure element based implementations, a contactless application (e.g., a mobile wallet or payment application for contactless transactions) using a contactless interface to communicate with a contactless reader of an access device would have to be coded for and be executed on a secure element in order to gain access to the contactless interface. In some embodiments, the portable communication device 110 may include a mobile operating system (OS) that implements a set of card emulation application programming interfaces (APIs), such as host card emulation (HCE) APIs, to allow the mobile application to gain access to the contactless interface of the portable communication device 110 without requiring the use of a secure element. For example, the card emulation APIs may be coded for and be executed from the mobile OS of the portable communication device 110, and may include programming function calls to allow the mobile application to receive, process, and respond to transaction communications (e.g., Application Protocol Data Unit (ADPU) commands sent from the contactless reader). In this manner, the portable communication device 110 is able to conduct contactless transactions without requiring access to a secure element on the portable communication device 110.

Once the portable communication device 110 and the mobile application 110 have been provisioned with the account parameters, then the portable communication device 110 can conduct cloud-based transactions by interacting with the contactless reader the of access device 130 (e.g., at a merchant point-of-sale (POS) location). The contactless reader may include one or more RF transceivers that can send and receive communications using NFC or other radio frequency or wireless communication protocols such as Bluetooth, BLE, Wi-Fi, iBeacon, etc. In some embodiments, the contactless reader may include an optical code scanner or reader to conduct transactions using quick response (QR)

codes, bar codes, etc. The access device 130 may also include a POS acceptance device and/or an electronic cash register.

To conduct a cloud-based transaction, a user of the portable communication device 110 may place the portable communication device 110 in proximity to the contactless reader of the access device 130, or display an image such as a QR code or bar code on a screen of the portable communication device 110 for scanning by the contactless reader of the access device 130. The portable communication device 110 may provide the access device 130 with an identifier (e.g., an account identifier such as a PAN, an alternate account identifier such as an alternate PAN, or a token, etc.) to identify the account of the user and additional information such as the limited-use account parameters or information derived from the limited-use account parameters (e.g., transaction cryptograms generated from a cryptogram generation key such as an LUK). For example, in some embodiments, an account identifier or token, and additional information (e.g., a transaction cryptogram, account parameters, etc.) can be transmitted to the access device 130 in APDU responses that are responsive to a series of APDU commands received from the access device 130. In some embodiments, an account identifier or token, and the additional information can be encoded in a QR code or bar code that is scanned and processed by the access device 130 to retrieve the encoded information. The access device 130, or a merchant computer coupled to the access device 130, may then generate an authorization request message including the account identifier or token, and additional information such as a transaction cryptogram and other transaction data, and forward the authorization request message to an acquirer server 140 associated with the merchant. The authorization request message can then be sent by the acquirer server 140 to a transactions processing network server 150.

The transaction processing network server 150 may include data processing subsystems, networks, and operations used to support and deliver authorization services, exception file services, transaction scoring services, and clearing and settlement services. Transaction processing networks can process credit card transactions, debit card transactions, and other types of transactions. Certain transaction processing networks may include a system that processes authorization requests and a base system which performs clearing and settlement services.

Upon receiving the authorization request message, the transaction processing network 150 may forward the authorization request message received from the acquirer server 140 to the issuer server 160 of the issuer holding the account of the user of the portable communication device 110. After the issuer server 160 receives the authorization request message, the authorization request message may be parsed, and the information in the authorization request message may be verified. For example, the issuer server 160 may verify that the transaction cryptogram was generated by a valid LUK, and that the set of one or more limited-use thresholds associated with the LUK has not been exceeded. In some embodiments, some or all of the information in the authorization request message can also be sent to CBP 170 for verification and processing. For example, if the issuer server 160 does not have the capability to verify the transaction cryptogram, then the transaction processing network 150 or issuer server 160 may forward the transaction cryptogram to CBP 170 for verification.

An authorization response message is then sent back to the transaction processing network 150 to indicate whether the current transaction is authorized (or not authorized). The transaction processing network 150 can forward the authorization response message to the acquirer server 140. In some embodiments, the transaction processing network 150 may decline the transaction even if the issuer server 160 authorized the transaction, for example, depending on a value of a fraud risk score or depending if limited-use account parameters are verified by CBP 170. The acquirer server 140 can send the authorization response message to the access device 130. The authorization response results, which may include transaction data for the transaction can be displayed by the access device 130, or be printed out on a physical receipt.

At the end of the day, a clearing and settlement process can be conducted by the transaction processing network 150. A clearing process is a process of exchanging financial details between an acquirer and an issuer to facilitate posting to a user's transaction account and reconciliation of the user's settlement position. Any of the acquirer server 140, the transaction processing network 150, the issuer server 160, the CBP 170, and/or the mobile application server 120 may be referred to as a remote computer, and may include one or more computing devices such as one or more computers or server computers to enable the entity to communicate with the other entities in the system 100, and/or to perform one or more of the functions described herein.

In other embodiments of system 100, the components or elements can be combined, or their functions may be separated into other computational components. For example, in some embodiments, the mobile application server 120 may be part of the issuer server 160, and/or the CBP 170, and/or the transaction processing network server 150, and these components need not exist as separate entities.

Figure 2:
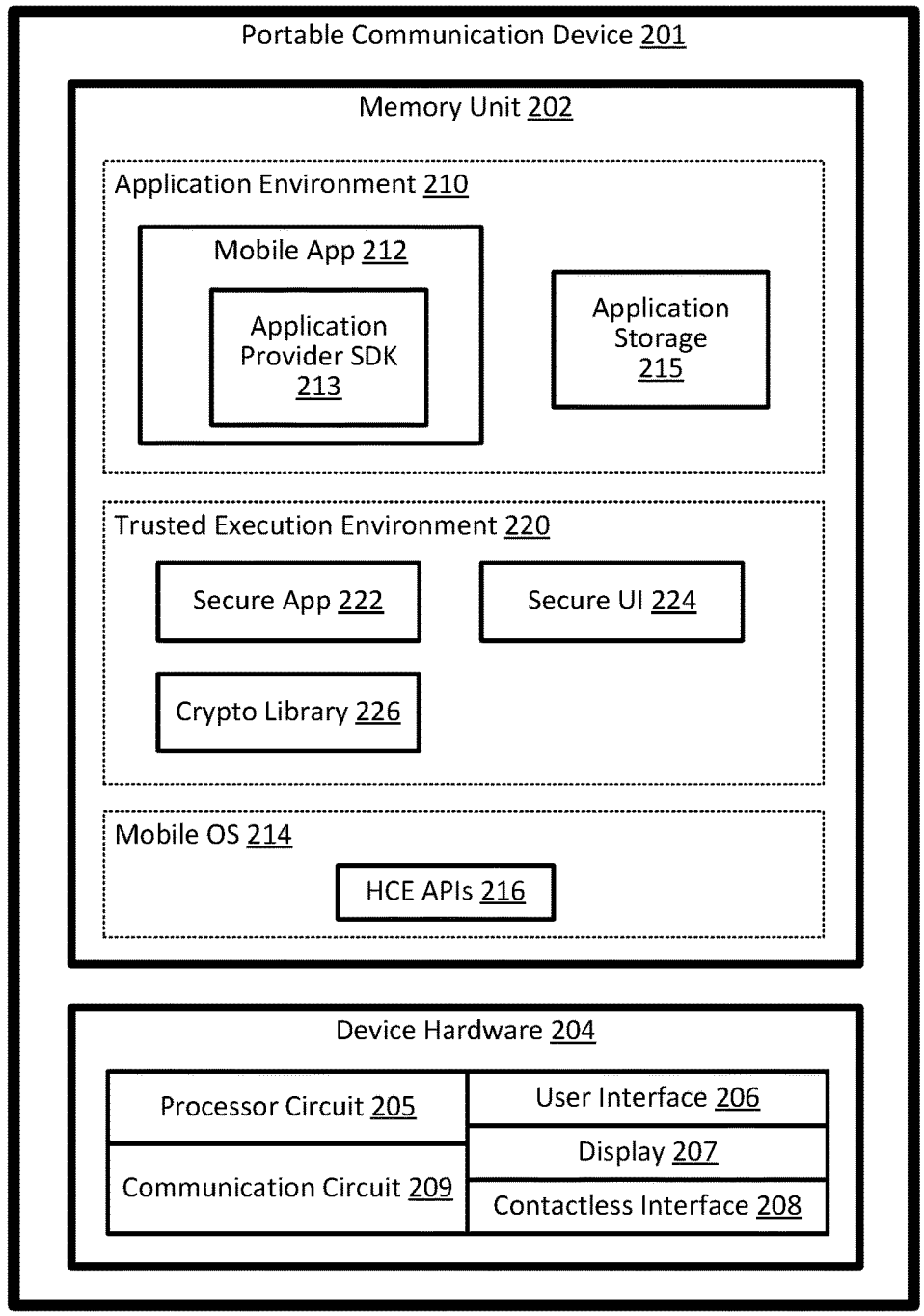
FIG. 2 shows a block diagram of components of a portable communication device, according to some embodiments.

FIG. 2 is a block diagram of components of a portable communication device 201, according to some embodiments. The portable communication device 201 may be configured similar to the portable communication device 110 of FIG. 1, and may be implemented in the system 100. Portable communication device 201 may include device hardware 204 coupled to a memory unit 202. The device hardware 204 may include a processor circuit 205, a communication circuit 209, a user interface 206, a display 207 (which may be part of user interface 206), and a contactless interface 208. The processor circuit 205 can be implemented as one or more integrated circuits (e.g., one or more single core or multicore microprocessors and/or microcontrollers), and is used to control the operation of the portable communication device 201. The processor 205 can execute a variety of programs in response to program code or computer-readable code stored in memory 202, and can maintain multiple concurrently executing programs or processes. The communication circuit 209 may include one or more RF transceivers and/or connectors (e.g., Wi-Fi or cellular) that can be used by portable communication device 201 to communicate with other devices and/or to connect with external networks (e.g., communication network 115). The user interface 206 can include any combination of input and output elements to allow a user to interact with and invoke the functionalities of the portable communication device 201. In some embodiments, the display 207 may be part of the user interface 206.

The contactless interface 208 may include one or more RF transceivers (e.g., NFC) to interact with a contactless reader of an access device to conduct a transaction (e.g., payment transaction, access transaction, information exchange, etc.). In secure element based implementations, only a secure element (not shown) may have access to the contactless interface 208. In some embodiments, the contactless interface 208 can be accessed by the mobile OS 214 using host card emulation (HCE) APIs 216 without requiring the use of a secure element. In some embodiments, the display 207 can also be part of the contactless interface 208, and is used, for example, to perform transactions using QR codes, bar codes, etc.

The memory unit 202 can be implemented using any combination of any number of non-volatile memories (e.g., flash memory) and volatile memories (e.g., DRAM, SRAM), or any other non-transitory storage medium, or a combination thereof media. The memory unit 202 may store the mobile OS 214. In some embodiments, mobile OS 214 may implement a set of card emulation APIs 216 that can be invoked by mobile application 212 to access contactless interface 208 to interact with an access device. The memory unit 202 may also store an application execution environment 210 where one or more mobile applications reside including mobile application 212 (e.g., a transaction application such as a mobile wallet application, a payment application, a merchant application, etc.) to be executed by processor circuit 205. The application execution environment 210 contains application storage 215 that can be accessed by applications executing in the application execution environment 210.

The memory unit 202 may also implement a trusted execution environment 220 that is separate and isolated from the application execution environment 220. For example, applications executing in the application execution environment 210 may not directly access the memory of the trusted execution environment 220. As further described below, an application program interface (API) may provide communication of data between the application execution environment 210 and the trusted application execution environment 220. The trusted execution environment 220 may contain a secure application 222 that can perform encryption and decryption of tokens and keys (e.g., LUKs) using keys stored in a crypto library 226. The secure application 222 can also generate a cryptogram to conduct a transaction for the mobile application 212 using keys stored in the crypto library 226. As further described below, the crypto library 226 may store keys for data being transported to and from the mobile application 212, and keys for storing data in the application execution environment 210 of the memory unit 202. The trusted execution environment 220 may also contain a secure user interface (UI) 224 that can receive input from a user. The input received by the secure UI 224 may not be directly accessible by applications executing in the application execution environment 210.

According to some embodiments, mobile application 212 can integrated a software development kit (SDK) 213 that is provided by an application provider such as an issuer or transaction service provider. The SDK 213 may provide functionalities to communicate with a transaction service provider for services such as token request and account parameters replenishment. The SDK 213 may access an application program interface (API) for communicating information between the secure application 222 executing in the trusted execution environment 222 and the mobile application 212 executing in the application execution environment.

Figure 3:
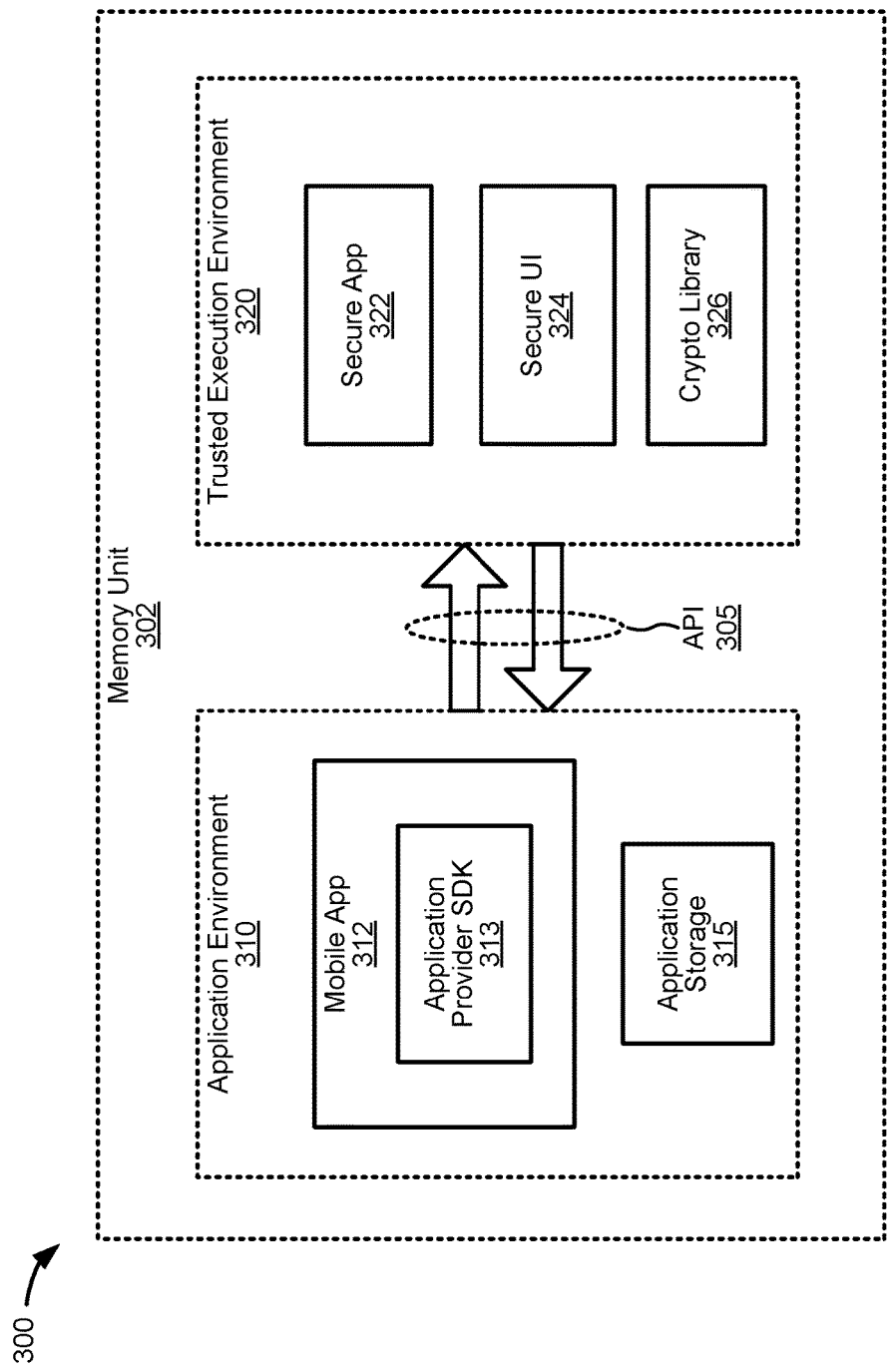
FIG. 3 shows a functional block diagram of an application program interface between an application execution environment and a trusted execution environment, according to some embodiments.

FIG. 3 shows a functional block diagram 300 of an application program interface 305 between an application execution environment 310 and a trusted execution environment 320, according to some embodiments. The portable communication devices 110 and 210 described above may implement the API 305 of FIG. 3. API 305 may provide a dedicated interface to allow an application executing in application execution environment 310 to communicate with and invoke functions implemented in trusted execution environment 320. As described above, the portable communication device may include a mobile application in the application execution environment 310 that uses host card emulation technology to communicate with an access device to conduct a transaction. However, without requiring the use of a secure element, sensitive data including account credentials (e.g., cryptogram generation key such as a limited-use key, token or other account identifier, and other account parameters or credentials) may be stored in the application storage of application execution environment 310 without the security safeguards provided by a secure element. As such, in order to protect the sensitive data, they are encrypted by the trusted execution environment 320 before being stored in the application storage of the application execution environment 310. At the time of a transaction, the mobile application can retrieve the encrypted sensitive data from the application storage, and passes the encrypted sensitive data to the trusted execution environment 320 via API 305. A secure application executing in the trusted execution environment 320 can decrypt the encrypted sensitive data including the account credentials, and generate a transaction cryptogram, which is then passed back to the mobile application via API 305. The account credentials and/or transaction cryptogram can then be transmitted to an access device to conduct a transaction.

The application execution environment 310 and the trusted execution environment 320 can be implemented in a memory unit 302 of a portable communication device. In some embodiments, the application execution environment 310 and the trusted execution environment 320 can be implemented as separate physical or logical components to provide physical or logical isolation between the two environments. For example, the application execution environment 310 can be implemented in one physical memory component, and the trusted execution environment 320 can be implemented in a separate physical memory component. The trusted execution environment can be provided and built into the portable communication device 110 or 220 by the portable communication device manufacturer, or by a provider or manufacturer of a component of the portable communication device (e.g., a manufacturer of the processor, developer of the operating system, etc.).

The various components of the application execution environment 310 and trusted execution environment 320 will now be described. The application execution environment 310 may include a mobile application 312 (e.g., a mobile wallet or payment application) and application storage 315. The mobile application 312 may include a software development kit (SDK) 313 that implements functionalities such as token request and account parameter replenishment (e.g., to replenish a cryptogram generation key such as a LUK) to conduct cloud-based transactions. As described above, the mobile application 312 may access a host card emulation driver that can be used to access an NFC controller of the portable communication device to communicate with a contactless interface of an access device to conduct a transaction. Application storage 315 can be used to store sensitive data including account credentials such as a token or other account identifier, cryptogram generation key such as LUK, etc.

The trusted execution environment 320 may include a secure application 322, a crypto library 326, and a secure UI 324. The secure application 322 may provide security sensitive functions and secure storage of sensitive data and information used by the mobile application 312. For example, secure application 322 may implement encryption and decryption functionalities (e.g., using 3DES, DES, AES, etc. or other suitable encryption/decryption algorithms) and may respond to encryption/decryption requests from mobile application 312 via API 305. In some embodiments, the secure application 322 may ignore requests that are not received from the mobile application 312, or ignore requests that are not received via API 305.

In some embodiments, the secure application 322 can be locked to the mobile application 312 such that no other application can call the secure application 322 during crypto operations (e.g., encryption and decryption). This can allow a series of crypto operation calls to be performed by the secure application 322 for a series of sensitive data.

The secure application 322 may also store portable communication device certificates (e.g., hash of device International Mobile Equipment Identity (IMEI) number or a serial identifier). The device certificates can be treated as sensitive data and may be encrypted by the secure application 322. The secure application 322 may also provide a certificate rotation mechanism. For example, the portable communication device may be pre-loaded with transaction service provider certificates including a Root Certificate, a Signature Certificate, and an Encryption Certificate. The Root Certificate on the portable communication device can enable secure rotation of the Signature and Encryption certificates. New certificates can be validated as being trusted certificates using the Root Certificate.

The crypto library 326 may contain multiple encryption keys of different types used by secure application 322. For example, the crypto library 326 may contain transport keys and storage keys. The transport keys may be used to encrypt sensitive data in transit to or from an external entity such as a remote server (e.g., a token service or cloud-based transaction service provider during token request or account parameters replenishment). The transport keys may include an encryption transport key that is used to decrypt or encrypt sensitive data (e.g., token or other account identifier, cryptogram generation key such as LUK, etc.) received from or sent to the external entity. The encryption transport key may provide end-to-end encryption of the sensitive data in addition to and on top of network layer encryption (e.g., Transport Layer Security (TLS) or Secure Sockets Layer (SSL)). In some embodiments, the sensitive data received from the external entity can be digitally signed by the external entity, and the transport keys stored in crypto library 32 may also include a signature transport key that is used to authenticate the identity of the external entity by verifying the digital signature. The transport keys can be provided by the manufacturer of the portable communication device or may be provided by a provider of the mobile application 312.

The storage keys are used to securely store data in the application storage 315. In some embodiments, the storage keys may be symmetric keys. As described in further detail below, sensitive data such as a token or LUK can be received by the portable communication device that is encrypted using a transport key by an external entity (e.g., remote server). This data may be passed to the secure application 322 from the mobile application 312 using API 305. The encrypted sensitive data can be decrypted by the secure application 322 using a transport key stored in the crypto library 326. The sensitive data is then re-encrypted by the secure application 322 using a storage key contained in the crypto library 326 before storing the sensitive data in application storage 315. For example, if the sensitive data is a token, the token may be encrypted using a token-storage key before storing the sensitive data in application storage 315. When the token is used at the time of a transaction, the token-storage key can be used to decrypt the token. If the sensitive data is a cryptogram generation key such as a LUK, the cryptogram generation key may be encrypted using a key-storage key before storing the sensitive data in application storage 315. When the cryptogram generation key is used at the time of a transaction, the key-storage key can be used to decrypt the cryptogram generation key.

In some embodiments, to provide support for different encryption/decryption algorithms, the crypto library 326 may provide support for padding different encryption types. As such, padding/un-padding of data for encryption/decryption can be handled by the crypto library 326 when the secure application 322 provides the padding type corresponding to a particular encryption/decryption algorithm to the crypto library.

The secure UI 324 may provide an interface for a user of the portable communication device to input sensitive data (e.g., to enter account information during enrollment to the cloud-based transaction or token service, or to enter a PIN, etc.). The secure UI 324 may be initiated for secure entry of sensitive information used by the mobile application 312. The input data received via secure UI 324 can be encrypted by the secure UI 324 and passed to the mobile application 312. Upon receiving a request from the mobile application 312, the secure application 322 can decrypt the input data for mobile application 312.

In some embodiments, the secure UI 324 can be provided by the manufacturer of the portable communication device, which can be a different entity than the application provider of mobile application 312. As such, a template structure can be defined to provide an interface to allow the secure UI 324 to pass input data to the mobile application. In some embodiments, the secure UI 324 may receive sensitive input data and package the sensitive input data into a template structure. Then, the whole template structure can be encrypted by the secure UI 324. The whole template structure can be provided to the mobile application 312. In some embodiments, the secure UI 324 can collect sensitive input data as separate fields and encrypts each field individually. The individual fields can be provided to mobile application 312. In such embodiments, the mobile application 312 can package the encrypted object fields into the template structure. The mobile application 312 can store the template structure including the encrypted object fields in the application storage 315. Upon request by the mobile application 312, the secure application 322 can decrypt each field of the template structure one by one, before calling an encryption operation.

As discussed above, API 305 provides an interface between the application execution environment 310 and the trusted execution environment 320, which allows mobile application 312 to access security sensitive functions implemented by secure application 322 executing in the trusted execution environment 320. The various functions supported by API 305 will now be described. In some embodiments, the various functions supported by API 305 that mobile application 312 can invoke may include one or more of: (1) an initialization function; (2) a re-initialization function; (3) a send sensitive data function; (4) a store sensitive data function; (5) a store local data function; (6) a retrieve local data function; (7) a cryptogram generation function; (8) an account parameter replenishment function; (9) a device attestation function; (10) a server attestation function; and (11) miscellaneous crypto function.

In some embodiments, mobile application 312 may invoke the initialization function to initialize the cryptographic system. The initialization function may prepare the crypto library 326 by loading the appropriate keys and encryption/decryption algorithms used by secure application 322. Mobile application 312 may also invoke the re-initialization function to re-initialize the cryptographic system during rotation operations, for example, to provide the secure application 322 with a new certificate or new keys.

The mobile application 312 may invoke the send sensitive data function to send sensitive data to an external entity (e.g., a remoter serve such as a cloud-based transaction server, an issuer server, or a transaction processing network server). When calling this function, the mobile application 312 may retrieve the sensitive data from the application storage 315 that the mobile application 312 wants to send to the external entity, and provide the sensitive data to the secure application 322. The sensitive data stored in application storage 315 may be encrypted by a storage key, which the mobile application 312 cannot decrypt. The mobile application 312 may provide the encrypted sensitive data with a data type identifier indicating the data type of the sensitive data to the secure application 322, such that the secure application 322 can properly decrypt the sensitive data. For example, depending on whether the data type identifier indicates the sensitive data is a cryptogram generation key (e.g., a LUK), or a token or other account identifier, the secure application 322 may use either a key-storage key or a token-storage key to decrypt the sensitive data. The secure application 322 can then re-encrypt the sensitive data using a transport key and provide the re-encrypted sensitive data back to the mobile application 312 for transmission over a network to the external entity. In some embodiments, the secure application 322 may also digitally sign the sensitive data using a certificate associated with the portable communication device.

The mobile application 312 may invoke the store sensitive data function to store sensitive data received from an external entity (e.g., a remote server such as a cloud-based transaction server, an issuer server, or a transaction processing network server) by the mobile application 312 over a network. The sensitive data can be, for example a cryptogram generation key (e.g., LUK), or a token or other account identifier. In some embodiments, the sensitive data received by the mobile application 312 may be encrypted by the external entity using a transport key. The sensitive data may also be signed by the external entity. When the mobile application 312 invoked this function, the mobile application may provide the encrypted and signed sensitive data to the secure application 322 with a data type identifier, and request the secure application 322 to securely store the sensitive data. The secure application 322 may decrypt the sensitive data using a transport key, verifying that the sensitive data was properly signed by the external entity using a certificate associated with the external entity, and then re-encrypt the sensitive data using a storage key based on the data type of the sensitive data. For example, when the data type identifier indicates that the sensitive data to store is a cryptogram generation key (e.g., LUK), the secure application 322 may re-encrypt the sensitive data using a key-storage key, and when the data type identifier indicates that the sensitive data to store is a token or other account identifier, the secure application 322 may re-encrypt the sensitive data using a token-storage key.

The mobile application 312 may invoke the store local data function to securely store local data. The mobile application 312 may invoke this function to store local data by providing the local data to store and a data type identifier of the local data to the secure application 322. The secure application 322 may encrypt the local data using a storage key selected from the crypto library 326 based on the data type identifier of the local data. The encrypted local data is returned back to the mobile application 322 for storage in the application storage 315. Examples of local data that can be stored using this function may include a previously provision token or other account identifier, user input data, or transaction verification log information that contains transaction data for each transaction conducted using the mobile application 322. For example, the transaction log data may include, for each transaction, a transaction timestamp, an unpredictable number received from an access device, am application transaction counter, a transaction type, a transaction amount, etc. In some embodiments, the transaction log data can be used during account parameters replenishment (e.g., to request a new LUK).

The mobile application 312 may invoke the retrieve local data function to retrieve encrypted local data from the application storage 315 and provide it to the secure application 322 for decryption. The mobile application 312 may provide the data type identifier for the local data with the encrypted local data to the secure application 322. The secure application 322 may decrypt the encrypted local data using a storage key selected from the crypto library 326 based on the data type identifier, and return the decrypted local data. Examples of local data that can be retrieved using this function may include a previously provision token or other account identifier, user input data, or transaction verification log information. In some embodiments, this function may not be used to retrieve a cryptogram generation key, because the cryptogram generation key may not be provided in the clear outside the trusted execution environment.

When conducting a transaction, the mobile application 312 may invoke the cryptogram generation function to generate a transaction cryptogram using a cryptogram generation key. When calling this function, the mobile application 312 may retrieve the encrypted cryptogram generation key (e.g., LUK) from the application storage 315, and provide the encrypted cryptogram generation key to the secure application 322. In some embodiments, transaction data such transaction amount, unpredictable number, transaction date, etc. (which may be received from an access device) can also be provide to the secure application 322. The secure application 322 may then decrypt the cryptogram generation key (e.g., LUK), and generate the transaction cryptogram by encrypting the transaction data or a static string with the cryptogram generation key. The secure application 322 returns the transaction cryptogram to the mobile application 312, and the mobile application 312 can provide the transaction cryptogram to an access device to conduct the transaction.

The mobile application 312 may invoke the account parameter replenishment function to request replenishment of a token or a cryptogram generation key from an external entity (e.g., a remote server such as a cloud-based transaction server, an issuer server, or a transaction processing network server). In order to authenticate the portable communication device and the mobile application 312 during the replenishment process, a hash value (e.g., a message authentication code) is computed over the transaction verification log stored on the portable communication device using the stored cryptogram generation key, and the hash value is provided to the external entity. The transaction verification log may contain transaction information for each transaction conducted using the current set of account parameters (e.g., current token, cryptogram generation key, etc.). The external entity may compute a hash value over its own record of the transactions that the mobile application 312 conducted using the current set of account parameters, and compare the hash values to determine that the portable communication device is the same device that had previously provisioned by the external entity. As such, when invoking this function, the mobile application 312 may provide the encrypted cryptogram generation key (e.g., LUK) and the transaction verification log to the secure application 322. The secure application 322 can decrypt the cryptogram generation key using a storage key, and generate a hash value over the transaction verification log using the cryptogram generation key. The hash value is then returned to the mobile application 312, and the mobile application 312 can send the hash value to the external entity to request the replenishment.

In some embodiments, the mobile application 312 or the external entity that the mobile application 312 communicates with (e.g., a remote server such as a cloud-based transaction server, an issuer server, or a transaction processing network server) may inquire about the current state of the portable communication device to ensure the portable communication device has not been hacked. For example, the mobile application 312 may invoke the device attestation function each time the mobile application 312 communicates with the secure application 322. The device attestation function can be called implicitly with another function call, and may return a set of attestation values representing the current state of the hardware and/or software of the portable communication device (e.g., OS version, hardware component identifiers, etc.). Similarly, the mobile application 312 may invoke the device attestation function in response to a demand from the remote server, for example, during provisioning, replenishment, or life cycle management.

For miscellaneous cryptographic operations, the mobile application 312 may invoke the miscellaneous crypto function to request the secure application 322 to perform cryptographic operations using certain cypher modes (e.g., data encryption standard (DES), triple DES (3DES), and Advanced Encryption Standard (AES) operations).

The various functions and operations supported by API 305 may be performed in combination or separately.

Figure 4:
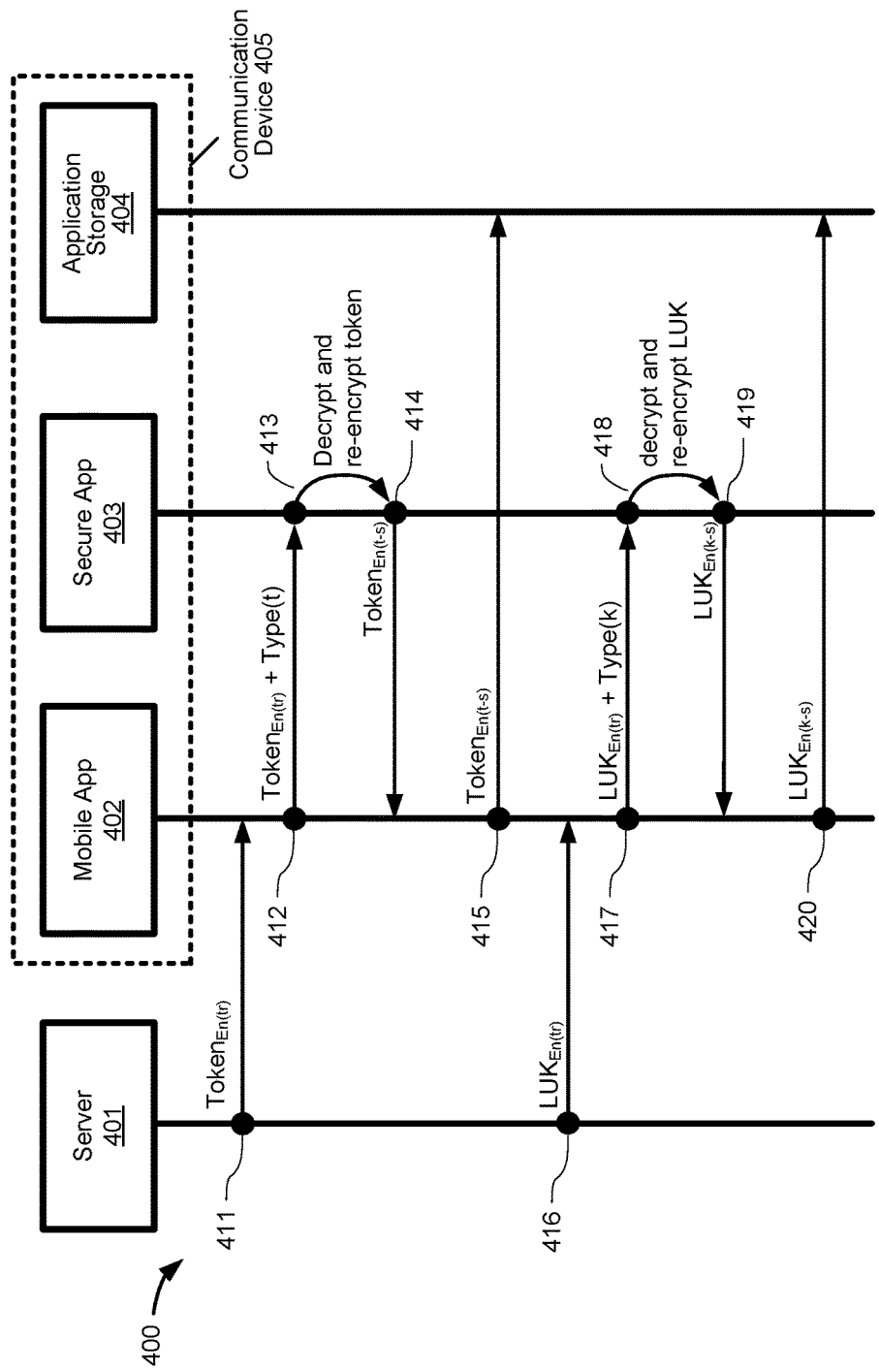
FIG. 4 shows a flow diagram of a mobile application storing sensitive data, according to some embodiments.

FIG. 4 shows a flow diagram 400 of a mobile application 402 receiving and storing sensitive data (e.g., token or other account identifier, cryptogram generation key such as a limited-use key, etc.), according to some embodiments. The flow diagram 400 (or portions thereof) may be performed when the mobile application 402 receives a token or other account identifier, or when the mobile application 402 receives a cryptogram generation key (e.g., a limited-use key) from a remote server 401 (e.g., a cloud-based transaction server, an issuer server, or a transaction processing network server). At step 411, server 401 may send a token or other account identifier ("$Token_{En(tr)}$") that is encrypted by server 401 using a transport key to the mobile application 402 running in an application execution environment on a portable communication device. In some embodiments, server 401 may also send a data type identifier to identify the sensitive data as a token or other account identifier.

The mobile application 402 can perform secure storage of the token by sending a storage request via an API to a secure application 403 executing in a trusted execution environment. At step 412, the mobile application 402 may send a storage request to the secure application 403 to securely store the token. The storage request may include $Token_{En(tr)}$ and a data type identifier indicating that the data type of the sensitive data to store is a token ("Type(t)") to the secure application 403. In some embodiments, the data type identifier can be encrypted as well.

In some embodiments, $Token_{En(tr)}$ can be signed by server 401, and the mobile application 402 can verify that $Token_{En(tr)}$ was signed by server 401 using a certificate associated with server 401 before requesting the secure application 403 to store the token. In some embodiments, the storage request sent by the mobile application 402 can include the signature, and the secure application 410 can be the one that verifies $Token_{En(tr)}$ was signed by server 401 using a certificate associated with server 401

At step 413, the secure application 403 selects a transport key from the crypto library and decrypts $Token_{En(tr)}$, and the data type identifier if encrypted. The secure application 403 determines that the data type identifier indicates the sensitive data to store is a token or other account identifier, and re-encrypts the token using a storage key selected from the crypto library. The storage key is selected based on the data type identifier. For example, since the data type of the sensitive data is a token, the secure application 403 selects a token-storage key to re-encrypt the token to generate the re-encrypted token ("$Token_{En(t-s)}$"). At step 414, the secure application 403 stores the re-encrypted token $Token_{En(t-s)}$ outside the trusted execution environment by returning $Token_{En(t-s)}$ to the mobile application 402. At step 415, the mobile application 402 stores $Token_{En(t-s)}$ in an application storage 404.

At step 416, server 401 may send a cryptogram generation key such as a limited-use key ("$LUK_{En(tr)}$") that is encrypted by server 401 using a transport key to the mobile application 402 running in an application execution environment on a portable communication device. In some embodiments, server 401 may also send a data type identifier to identify the sensitive data as a cryptogram generation key (e.g., a limited-use key).

The mobile application 402 can perform secure storage of the cryptogram generation key (e.g., a limited-use key) by sending a storage request via an API to the secure application 403 executing in the trusted execution environment. At step 417, the mobile application 402 may send a storage request to the secure application 403 to securely store the token. The storage request may include $LUK_{En(tr)}$ and a data type identifier indicating that the data type of the sensitive data to store is a cryptogram generation key ("Type(k)") to the secure application 403. In some embodiments, the data type identifier can be encrypted as well.

In some embodiments, $LUK_{En(tr)}$ can be signed by server 401, and the mobile application 402 can verify that $LUK_{En(tr)}$ was signed by server 401 using a certificate associated with server 401 before requesting the secure application 403 to store the token. In some embodiments, the storage request sent by the mobile application 402 can include the signature, and the secure application 410 can be the one that verifies $LUK_{En(tr)}$ was signed by server 401 using a certificate associated with server 401

At step 418, the secure application 403 selects a transport key from the crypto library and decrypts $LUK_{En(tr)}$, and the data type identifier if encrypted. The secure application 403 determines that the data type identifier indicates the sensitive data to store is a cryptogram generation key (e.g., a limited-use key), and re-encrypts the token using a storage key selected from the crypto library. The storage key is selected based on the data type identifier. For example, since the data type of the sensitive data is a cryptogram generation key, the secure application 403 selects a key-storage key to re-encrypt the cryptogram generation key to generate the re-encrypted cryptogram generation key ("$LUK_{En(k-s)}$"). At step 419, the secure application 403 stores the re-encrypted cryptogram generation key $LUK_{En(k-s)}$ outside the trusted execution environment by returning $LUK_{En(k-s)}$ to the mobile application 402. At step 420, the mobile application 402 stores $LUK_{En(k-s)}$ in the application storage 404.

Figure 5:
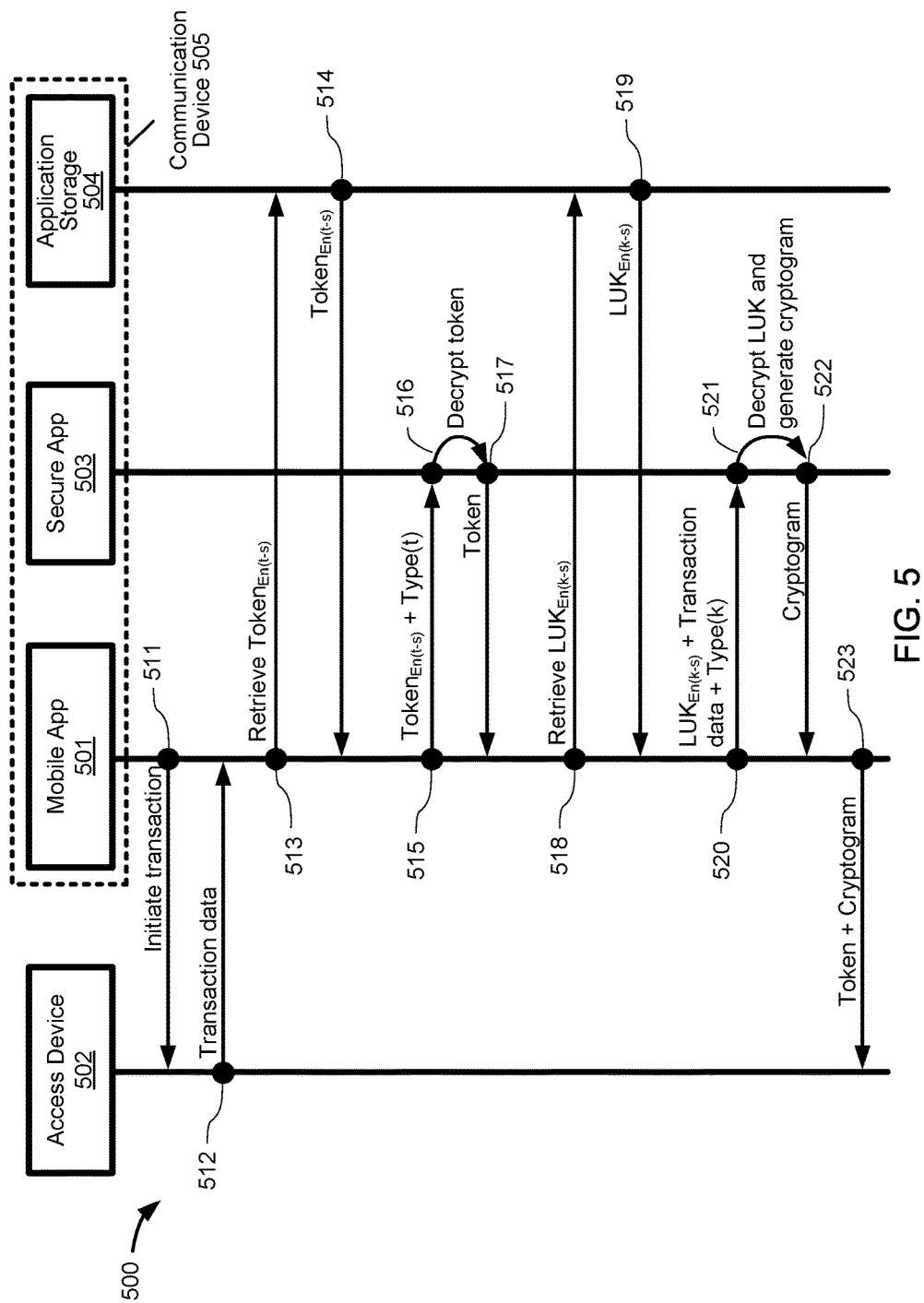
FIG. 5 shows a flow diagram of a mobile application conducting a transaction, according to some embodiments.

FIG. 5 shows a flow diagram 500 of a mobile application 501 conducting a transaction with an access device 502, according to some embodiments. At step 511, the mobile application 501 may interact with access device 502 to initiate a transaction. For example, the mobile application 501 may communicate with access device 502 when the communication device 505 is brought in proximity to the access device 502. As described above, the mobile application 501 running on the communication device 505 may communicate with the access device 502 over a contactless interface. At step 512, the access device 502 provides transaction data to the mobile application 501. The transaction data may include, for example, a transaction amount, a transaction date, an unpredictable number from the access device 502, and/or other dynamic transaction data.

At step 513, the mobile application 501 retrieve a token or other account identifier stored in the application storage 504. —The token or other account identifier may have been stored in the application storage 504 as described above with respect to FIG. 4. Thus, the token or other account identifier may have been previously encrypted using a token-storage key, and the token or other account identifier retrieved can be an encrypted token or other account identifier ("$Token_{En(t-s)}$"). At step 514, the application storage 504 returns $Token_{En(t-s)}$ to the mobile application 501.

At step 515, the mobile application 501 may send $Token_{En(t-s)}$ and a data type identifier to the secure application 503. The data type identifier may indicate the data being send is a token ("Type(t)"). In some embodiments, the data type identifier can be encrypted as well. At step 516, the secure application 503 decrypts the data type identifier if encrypted, and selects a storage key from a crypto library based on the data type as indicated by the data type identifier. For example, since the data type identifier indicates that the data is a token, the secure application 503 may select a token-storage key to decrypt $Token_{En(t-s)}$. At step 517, the secure application 503 returns the decrypted token to the mobile application 501.

The mobile application 502 can request the secure application 503 to generate a transaction cryptogram via an API. At step 518, the mobile application 501 may retrieve a cryptogram generation key (e.g., a limited-used key) from the secure application 503. The cryptogram generation key may have been stored in the application storage 504 as described above with respect to FIG. 4. Thus, the cryptogram generation key may have been previously encrypted using a key-storage key, and the cryptogram generation key retrieved can be an encrypted cryptogram generation key ("$LUK_{En(k-s)}$"). At step 519, the application storage 504 returns $LUK_{En(k-s)}$ to the mobile application 501.

At step 520, the mobile application 501 may send a cryptogram generation request to the secure application 503. The cryptogram generation request may include $LUK_{En(k-s)}$, a data type identifier indicating that the data is a key ("Type(k)"), and the transaction data. In some embodiments, the data type identifier can be encrypted as well. At step 521, the secure application 503 decrypts the data type identifier if encrypted, and selects a storage key from a crypto library based on the data type of the data. For example, since the data type identifier indicates that the data is a key, the secure application 503 may select a key-storage key to decrypt $LUK_{En(k-s)}$. The secure application 503 may then generate a transaction cryptogram by encrypting the transaction data using the decrypted cryptogram generation key. At step 522, the secure application 503 returns the generated transaction cryptogram to the mobile application 501. At step 523, the mobile application 501 sends the decrypted token and the transaction cryptogram to the access device 502 to conduct the transaction.

Figure 6:
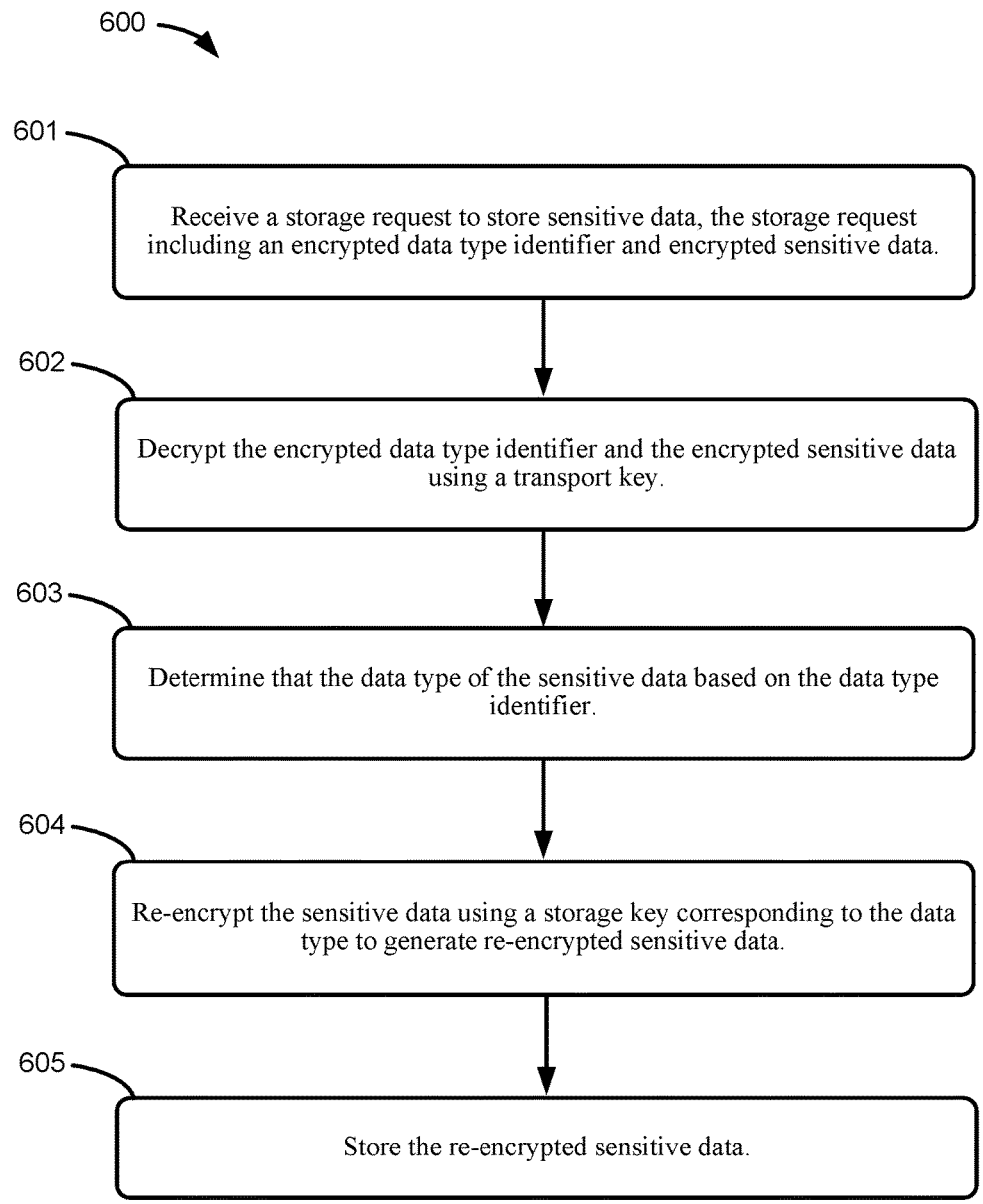
FIG. 6 shows a flow chart of a method for managing sensitive data on a portable communication device, according to some embodiments.

FIG. 6 illustrates a flow chart 600 of a method for managing sensitive data on a portable communication device, according to some embodiments. The portable communication device may have a mobile application executing in an application execution environment and a secure application executing in a trusted execution environment. The application execution environment and the trusted execution environment may be configured as described above with respect to FIGS. 2 and 3. The method may begin at step 601. At step 601, the secure application receives a storage request from the mobile application. The storage request is a request to store sensitive data. The storage request may include an encrypted data type identifier and encrypted sensitive data. In some embodiments, the encrypted sensitive data was received by the mobile application from a server, and the encrypted sensitive data is signed by the server. In some embodiments, the storage request can be in the form of an API call for storing sensitive data as described above with respect to FIG. 4.

At step 602, the secure application decrypts the encrypted data type identifier and the encrypted sensitive data using a transport key. The secure application may also verify that the encrypted sensitive data was signed by the server using a certificate associated with the server. At step 603, the secure application determines the data type of the sensitive data based on the data type identifier. For example, the secure application may determine the data type identifier indicates that the sensitive data is a cryptogram generation key such as a limited-use key, or that the data type identifier indicates that the sensitive data is a token or other account identifier.

At step 604, the secure application re-encrypts the sensitive data using a storage key to generate re-encrypted sensitive data. In some embodiments, different storage keys can be used for different data types. For example, when the sensitive data is a cryptogram generation key such as a limited-use key, the secure application may re-encrypt the cryptogram generation key using a key-storage key to generate a re-encrypted cryptogram generation key. When the sensitive data is a token or other account identifier, the secure application may re-encrypt the token or other account identifier using a token-storage key to generate a re-encrypted token or other account identifier. At step 605, the secure application may store the re-encrypted sensitive data in a memory of the portable communication device which is outside the trusted execution environment. For example, the secure application may send the re-encrypted sensitive data to the mobile application for storage in the application storage area of the application execution environment of the portable communication device.

Figure 7:
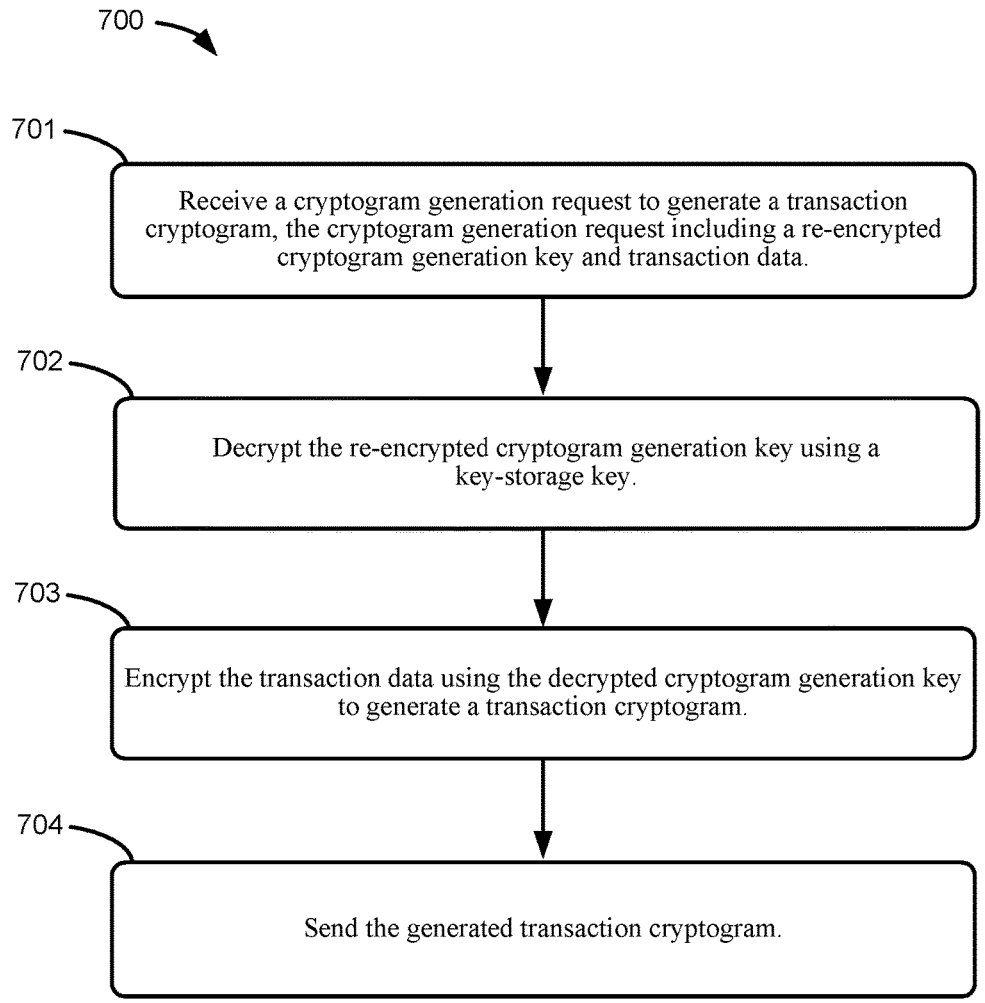
FIG. 7 shows a flow chart of a method for generating a transaction cryptogram on a portable communication device, according to some embodiments.

FIG. 7 illustrates a flow chart 700 of a method for generating a transaction cryptogram, according to some embodiments. At step 701, the secure application may receive a cryptogram generation request from the mobile application to generate a transaction cryptogram. The cryptogram generation request may include a re-encrypted cryptogram generation key (e.g., limited-use key) and transaction data. The transaction data may have been received by the mobile application from an access device. At step 702, the secure application may decrypt the re-encrypted cryptogram generation key using a key-storage key. At step 704, the secure application may encrypt the transaction data using the decrypted cryptogram generation key to generate a transaction cryptogram. At step 706, the secure application may send the generated transaction cryptogram to the mobile application. The secure application may also decrypt a re-encrypted token or other account identifier using a token-storage key, and send the decrypted token or other account identifier to the mobile application. The mobile application may then transmit the generated transaction cryptogram and the token or other account identifier to the access device to conduct a transaction.

Figure 8:
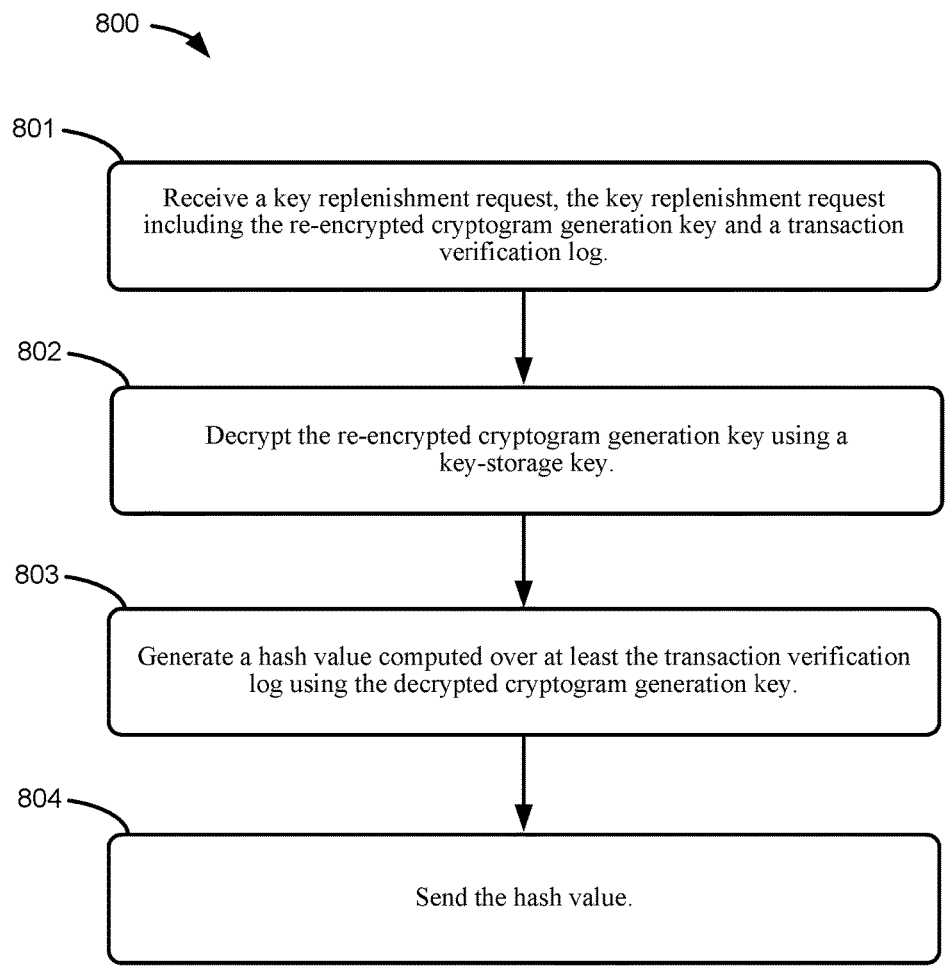
FIG. 8 shows a flow chart of a method for replenishing account parameters to a portable communication device, according to some embodiments.

FIG. 8 illustrates a flow chart 800 of a method for replenishing account parameters to a portable communication device, according to some embodiments. At step 801, the secure application may receive a replenishment request from the mobile application. The replenishment request can be, for example, a key replenishment request to request a new cryptogram generation key such as a new limited-use key. The replenishment request may include a re-encrypted cryptogram generation key and a transaction verification log containing transaction data for previous transactions conducted using the current set of account parameters. At step 802, the secure application may decrypt the re-encrypted cryptogram generation key using a key-storage key. At step 803, the secure application may generate a hash value that is computed over at least the transaction verification log using the decrypted cryptogram generation key. The hash value can be, for example, a message authentication code. At step 804, the secure application sends the hash value to the mobile application. The mobile application may then send the hash value to a remote server. The remote server may verify the hash value against its record of past transactions conducted using the mobile application, and provide the portable communication device with a new set of account parameters (e.g., a new cryptogram generation key such as a limited-use key, or a new token or other account identifier).

Embodiments of the disclosure are not limited to the above-described embodiments. For example, although separate functional blocks are shown for an issuer server, transaction processing network server, and acquirer, some entities may perform a combination or all of these functions and may be included in some embodiments.

Any of the computing devices, communication devices, computers, servers, and the like described herein can be implemented using one or more processors coupled to a memory that store code or instructions, which when executed by the one or more processors, cause the device to perform one or more of the methods and processes described herein. Memory, storage media, and computer-readable media for containing code, or portions of code described herein, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Specific details regarding some of the above-described aspects are provided above. The specific details of the specific aspects may be combined in any suitable manner without departing from the spirit and scope of embodiments of the disclosure. For example, back end processing, data analysis, data collection, and other transactions may all be combined in some embodiments of the disclosure. However, other embodiments of the disclosure may be directed to specific embodiments relating to each individual aspect, or specific combinations of these individual aspects.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It should be understood that the present disclosure as described above can be implemented in the form of control logic using computer software (stored in a tangible physical medium) in a modular or integrated manner. The present disclosure may also be implemented in other ways and/or methods using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A portable communication device comprising:
   one or more processor circuits; and
   one or more memory units coupled to the one or more processor circuits and storing computer readable code implementing a secure application in a trusted execution environment, which when executed by the one or more processor circuits, performs operations including:
   receiving, by the secure application from a mobile application executing in an application execution environment of the portable communication device, a first storage request, the first storage request including a first encrypted data type identifier and an encrypted cryptogram generation key;

decrypting, by the secure application, the first encrypted data type identifier and the encrypted cryptogram generation key using a transport key;

determining, by the secure application, that the first decrypted data type identifier indicates the first storage request is for a cryptogram generation key;

re-encrypting, by the secure application, the decrypted cryptogram generation key using a key-storage key to generate a re-encrypted cryptogram generation key;

storing the re-encrypted cryptogram generation key outside the trusted execution environment;

receiving, by the secure application from the mobile application, a cryptogram generation request, the cryptogram generation request including the re-encrypted cryptogram generation key and transaction data for a transaction, wherein the transaction data is received by the mobile application from an access device;

decrypting, by the secure application, the re-encrypted cryptogram generation key using the key-storage key;

encrypting, by the secure application, the transaction data using the decrypted cryptogram generation key to generate the transaction cryptogram; and sending, by the secure application to the mobile application, the generated transaction cryptogram, wherein the mobile application transmits the generated transaction cryptogram to the access device to conduct the transaction.

2. The portable communication device of claim 1, wherein the operations further include:

receiving, by the secure application from the mobile application, a second storage request, the second storage request including a second encrypted data type identifier and an encrypted token;

decrypting, by the secure application, the second encrypted data type identifier and the encrypted token using the transport key;

determining, by the secure application, that the second decrypted data type identifier indicates the second storage request is for a token;

re-encrypting, by the secure application, the decrypted token using a token-storage key to generate a re-encrypted token; and storing the re-encrypted token outside the trusted execution environment.

3. The portable communication device of claim 2, wherein the operations further include:

decrypting, by the secure application, the re-encrypted token using the token-storage key; and sending, by the secure application to the mobile application, the decrypted token.

4. The portable communication device of claim 1, wherein the cryptogram generation key is a limited-use key.

5. The portable communication device of claim 4, wherein the operations further include:

receiving, by the secure application from the mobile application, a key replenishment request, the key replenishment request including the re-encrypted cryptogram generation key and a transaction verification log;

decrypting, by the secure application, the re-encrypted cryptogram generation key using the key-storage key;

generating, by the secure application, a hash value computed over at least the transaction verification log using the decrypted cryptogram generation key; and sending, by the secure application to the mobile application, the hash value.

6. The portable communication device of claim 5, wherein the mobile application sends the hash value to a server to request a new limited-use key.

7. The portable communication device of claim 1, wherein the encrypted cryptogram generation key is received by the mobile application from a server, and the encrypted cryptogram generation key is signed by the server.

8. The portable communication device of claim 7, wherein the operations further include:

verifying, by the secure application, that the encrypted cryptogram generation key was signed by the server using a certificate associated with the server.

9. The portable communication device of claim 1, wherein the operations further include:

storing, by the secure application, a crypto library in the trusted execution environment, the crypto library including the transport key, the key-storage key, and the token-storage key.

10. The portable communication device of claim 1, wherein the operations further include:

selecting, by the secure application, the key-storage key to use for the re-encrypting of the decrypted cryptogram generation key based on the first encrypted data type identifier indicating the first storage request is for the cryptogram generation key.

11. A method for managing sensitive data in a portable communication device having a mobile application executing in an application execution environment and a secure application executing in a trusted execution environment, the method comprising:

receiving, by the secure application from the mobile application, a first storage request, the first storage request including a first encrypted data type identifier and an encrypted cryptogram generation key;

decrypting, by the secure application, the first encrypted data type identifier and the encrypted cryptogram generation key using a transport key;

determining, by the secure application, that the first decrypted data type identifier indicates the first storage request is for a cryptogram generation key;

re-encrypting, by the secure application, the decrypted cryptogram generation key using a key-storage key to generate a re-encrypted cryptogram generation key;

storing the re-encrypted cryptogram generation key in a memory of the portable communication device which is outside the trusted execution environment;

receiving, by the secure application from the mobile application, a cryptogram generation request, the cryptogram generation request including the re-encrypted cryptogram generation key and transaction data for a transaction, wherein the transaction data is received by the mobile application from an access device;

decrypting, by the secure application, the re-encrypted cryptogram generation key using the key-storage key;

encrypting, by the secure application, the transaction data using the decrypted cryptogram generation key to generate the transaction cryptogram; and sending, by the secure application to the mobile application, the generated transaction cryptogram, wherein the mobile application transmits the generated transaction cryptogram to the access device to conduct the transaction.

12. The method of claim 11, further comprising:
receiving, by the secure application from the mobile application, a second storage request, the second storage request including a second encrypted data type identifier and an encrypted token;
decrypting, by the secure application, the second encrypted data type identifier and the encrypted token using the transport key;
determining, by the secure application, that the second decrypted data type identifier indicates the second storage request is for a token;
re-encrypting, by the secure application, the decrypted token using a token-storage key to generate a re-encrypted token; and
storing the re-encrypted token in the memory of the portable communication device which is outside the trusted execution environment.

13. The method of claim 12, further comprising:
decrypting, by the secure application, the re-encrypted token using the token-storage key; and
sending, by the secure application to the mobile application, the decrypted token.

14. The method of claim 11, wherein the cryptogram generation key is a limited-use key.

15. The method of claim 14, further comprising:
receiving, by the secure application from the mobile application, a key replenishment request, the key replenishment request including the re-encrypted cryptogram generation key and a transaction verification log;
decrypting, by the secure application, the re-encrypted cryptogram generation key using the key-storage key;
generating, by the secure application, a hash value computed over at least the transaction verification log using the decrypted cryptogram generation key; and
sending, by the secure application to the mobile application, the hash value.

16. The method of claim 15, wherein the mobile application sends the hash value to a server to request a new limited-use key.

17. The method of claim 11, wherein the encrypted cryptogram generation key is received by the mobile application from a server, and the encrypted cryptogram generation key is signed by the server.

18. The method of claim 17, further comprising: verifying, by the secure application, that the encrypted cryptogram generation key was signed by the server using a certificate associated with the server.

19. The method of claim 11, further comprising:
storing, by the secure application, a crypto library in the trusted execution environment, the crypto library including the transport key, the key-storage key, and the token-storage key.

20. The method of claim 11, further comprising:
selecting, by the secure application, the key-storage key to use for the re-encrypting of the decrypted cryptogram generation key based on the first encrypted data type identifier indicating the first storage request is for the cryptogram generation key.

* * * * *